(12) United States Patent
Bumiller

(10) Patent No.: US 9,984,364 B2
(45) Date of Patent: May 29, 2018

(54) MESSAGING PROTOCOL FOR SECURE COMMUNICATION

(71) Applicant: George Baldwin Bumiller, Ramsey, NJ (US)

(72) Inventor: George Baldwin Bumiller, Ramsey, NJ (US)

(*) Notice: Subject to any disclaimer, the term of this patent is extended or adjusted under 35 U.S.C. 154(b) by 0 days. days.

(21) Appl. No.: 14/214,243

(22) Filed: Mar. 14, 2014

(65) Prior Publication Data

US 2014/0289131 A1  Sep. 25, 2014

Related U.S. Application Data

(60) Provisional application No. 61/800,006, filed on Mar. 15, 2013.

(51) Int. Cl.
 *G06Q 20/32* (2012.01)
 *H04L 12/58* (2006.01)

(52) U.S. Cl.
 CPC ..... *G06Q 20/3226* (2013.01); *G06Q 20/3278* (2013.01); *H04L 51/04* (2013.01); *H04L 51/38* (2013.01)

(58) Field of Classification Search
 CPC ........ G06Q 20/00–20/425; H04L 51/00–51/38
 USPC ............ 705/50–500; 709/200–253; 455/466
 See application file for complete search history.

(56) References Cited

U.S. PATENT DOCUMENTS

| | | | |
|---|---|---|---|
| 7,711,362 B2 | 5/2010 | Bumiller | |
| 7,819,307 B2 | 10/2010 | Lyons et al. | |
| 8,014,722 B2 | 9/2011 | Abel et al. | |
| 8,041,338 B2 | 10/2011 | Chen et al. | |
| 2005/0193133 A1* | 9/2005 | Niemi et al. | 709/230 |
| 2006/0183462 A1 | 8/2006 | Kolehmainen | |
| 2007/0094150 A1* | 4/2007 | Yuen et al. | 705/64 |

(Continued)

FOREIGN PATENT DOCUMENTS

| | | |
|---|---|---|
| EP | 2364006 A1 | 9/2011 |
| JP | 2009237974 A | 10/2009 |

(Continued)

OTHER PUBLICATIONS

A Generic Model for NFC-based Mobile Commerce, Cheng et al., Feb. 2009, 6 pages.

(Continued)

*Primary Examiner* — Mohammad A. Nilforoush
(74) *Attorney, Agent, or Firm* — The Juhasz Law Firm

(57) ABSTRACT

An illustrative method, system, and device for communicating a message over a network between a trusted service manager and a mobile device having a security element includes the steps of: providing a message having a header field and a message field; providing a number in the header field that is unique to the mobile device; providing a message in the message field, the message coming from the mobile device if communicated from the mobile device to a trusted service manager and coming from the trusted service manager if communicated from the trusted service manager to the mobile device; and providing a messaging protocol that enables the network to distinguish between a message having the unique mobile device number in the header field and a message that is without the unique mobile device number in the header field.

8 Claims, 11 Drawing Sheets

(56) References Cited

U.S. PATENT DOCUMENTS

| | | | |
|---|---|---|---|
| 2008/0208762 A1 | 8/2008 | Arthur et al. | |
| 2009/0104888 A1 | 4/2009 | Cox | |
| 2009/0215476 A1* | 8/2009 | Tysowski | 455/466 |
| 2009/0307139 A1 | 12/2009 | Mardikar et al. | |
| 2010/0267359 A1* | 10/2010 | Gyllensvaan | H04W 76/007 455/404.1 |
| 2011/0087610 A1* | 4/2011 | Batada et al. | 705/318 |
| 2011/0106635 A1 | 5/2011 | Khan et al. | |
| 2012/0255028 A1* | 10/2012 | Williams et al. | 726/26 |
| 2013/0151400 A1* | 6/2013 | Makhotin et al. | 705/39 |

FOREIGN PATENT DOCUMENTS

| | | |
|---|---|---|
| WO | 11/128913 A1 | 4/2011 |
| WO | 11/110438 A1 | 9/2011 |

OTHER PUBLICATIONS

Search Report, "Patent Search," Oct. 26, 2011, the Patent People, Questel IP Consulting, 2 pages.

\* cited by examiner

| 402 | 404 | 406 | 408 | 410 | 412 | 414 | 416 | 418 | 420 | 422 |
|---|---|---|---|---|---|---|---|---|---|---|
| E-MAIL ADDRESS | PIN ADDRESS | PIN DATE CHANGE | SUBSCRIP-TION INFO | SIM INFO | IMEI | NAME | LOCATION | TSM ADDRESS | TSM ADDRESS DATE CHANGED | TSM |
| | | | | | | | | | | |

FIG.5

MESSAGING PROTOCOL FOR SECURE COMMUNICATION

RELATED APPLICATION

This application is a non-provisional of and claims the benefit of U.S. Provisional Application 61/800,006, of the same title, filed Mar. 15, 2013, which is hereby incorporated by reference in its entirety.

TECHNICAL FIELD

This disclosure is directed to mobile devices, systems, and methods for providing secure messaging. More specifically, this disclosure is directed to a messaging control device, system, and method for facilitating communication of a message involving SE embedded data between a mobile device and a trusted service manager (TSM) or payment company (PC) over a network.

BACKGROUND

Radio communication in the near field, otherwise known as NF communication or simply NFC, makes it possible for a network device, such as a mobile device, to communicate with other devices in a peer-to-peer model. It is the limitation of NFC to communication over a short range of distances that makes NFC particularly useful in communications requiring a higher degree of security. Some examples of communications requiring a higher degree of security may include those involving a credit card transaction or gaining entry by a person to a secured facility.

One emerging use of NFC in the mobile phone communications field of use is in the area of financial transactions. Conventionally, many financial transactions are credit or debit card based. Cards are swiped through card readers which are typically hard wired or wirelessly connected to a server controlled by a trusted service manager (TSM) or a payment company, which may audit each credit card transaction for approval. The process is typically initiated at the point of sale by the swiping of the card through the card reader. The card reader typically captures the credit card data embedded in the card, as part of the "reading" operation, and formats the data for transmission typically to a server of a lending institution where the credit card data may be deciphered to determine the identity of the purchaser, the associated account of the lender from which the funds are to be drawn, the availability of funds for the purchase, etc. If the transaction is approved, the purchaser's account will be debited and the creditor's account credited all in accordance with the terms of the credit card agreement between the purchaser, the lender, and the merchant. Another example of a card based transaction is the withdrawal of money from an automatic teller machine. In this case, the ATM machine may read the card and format the data for use in the subsequent processes that are typically required for approval and payment by a TSM or a payment company.

By providing a mobile phone with an NFC radio, the mobile phone may be made so secure as to take the place of the credit card in providing the user identity and account information in the foregoing financial transaction in systems that are equipped with an NFC receiver. In addition to the foregoing or other kinds of financial transactions, a mobile phone that is provided with NFC communication capabilities may be particularly useful in any peer to peer application involving secure messaging.

To make these secure messages even more secure, the mobile phone may be further provided with a secure element (SE) in which may be embedded the sensitive information about the user. In a financial transaction, the SE may effectively serve as a "wallet" inside the phone and each sector of account specific information of the user inside that wallet may effectively serve as a separate credit card in that wallet. By selective use of these "virtual credit cards", a user can provide a trusted service manager (TSM) or a payment company with secure messages containing the information necessary to approve and enable the transaction; much as a user does conventionally using credit cards.

Hence, NFC as used with mobile communications devices, provides some key advantages. For example, NFC may provide (in effect) several credit or debit cards in a single device's SE. NFC may enable non-contact use of a selected card when checking out, through the NFC radio link. NFC may provide a communications link between the SE (secure element) in the mobile device and the card issuer or TSM (trusted service manager) managing the card. A message from the TSM or card issuer sent to the SE may be used to modify or edit the card in the SE. This link, used from time to time, enables the card issuer to quickly change the "card" when it has been compromised With a physical card, the user would have to wait for physical delivery of the replacement card. NFC may also be used to modify or edit the "card".

The NFC specifications permit the SE to be implemented within the SIM card, or within the mobile device (i.e. not within the SIM card.

Most cellular service providers implement the SE with the SIM card that they provide to their cellular subscribers. The SIM card itself is a secure device, under the control of the cellular service provider. In this case, the communications link between the card issuer or TSM and the SE will be carried between the cellular carrier's Mobile Service Center (MSC) and the SIM over the cellular channels normally used by the cellular carrier for communications with the SIM card. The address of the SIM card is the IMSI, international mobile subscriber identity; this identity would be in the card issuer's or TSM's data base. The data, once received by the SE, would have the identity of the particular "card" that it is addressed to.

Where the application requiring secure messaging involves the security of a building, the SE may effectively serve as a "virtual" badge or card or other device worn or carried by a person with the SE embedded data serving as the data that is conventionally embedded in a physical badge or card or other worn device used by a person to gain entry into a building. In these and other applications, the NFC broadcasting of SE embedded sensitive information that enables more secure messaging.

There is a need for making NFC or other broadcasted messages involving SE embedded data that are transmitted over a network even more secure. This disclosure addresses that need.

SUMMARY OF THE INVENTION

This disclosure is directed to a messaging control device, system, and method for more securely communicating a message involving SE embedded data between a mobile device and a trusted service manager (TSM) or payment company (PC) over a network.

In an illustrative method for communicating a message over a network between a trusted service manager and a mobile device having a security element, the method includes the steps of: providing a message having a header field and a message field; providing a number in the header field that is unique to the mobile device; providing a message in the message field, the message coming from the mobile device if communicated from the mobile device to a trusted service manager and coming from the trusted service manager if communicated from the trusted service manager to the mobile device; and providing a messaging protocol that enables the network to distinguish between a message having the unique mobile device number in the header field and a message that is without the unique mobile device number in the header field. If the header field of a message is without the unique mobile device number, the network processes the message. If the header field of a message contains the unique mobile device number, the network passes the message over to a trusted relay for processing the message between the trusted service manager and the mobile device according to the messaging protocol.

In an illustrative system for communicating a message over a network between a trusted service manager and a mobile device, the system includes: a mobile device having a secure element for sending messages to and receiving messages from a trusted service manager; a network; a trusted relay; and a messaging protocol that enables the network to distinguish between messages being transmitted between the mobile device and the trusted service manager from other messages being transmitted on the network. Illustratively, the network processes the messages that are other than the messages that are being transmitted between the mobile device and the trusted service manager. The network transfers the messages that are being transmitted between the mobile device and the trusted service manager to the trusted relay for processing according to the messaging protocol.

Illustratively, the mobile device is a RIM BlackBerry device and the identification number unique to the mobile device is a personal identification number (PIN). The message may illustratively pertain to a financial transaction or accessing entry to a secure facility. In addition, the message to and from the mobile phone may occur using near field communication spectrum.

BRIEF DESCRIPTION OF THE DRAWINGS

FIG. 5 is an illustrative embodiment of certain fields of a relay database data store 380 and TSM registry 382 of FIG. 4 that a trusted relay server 300 of FIG. 4 may use according to this disclosure.

DETAILED DESCRIPTION

Figure 1:
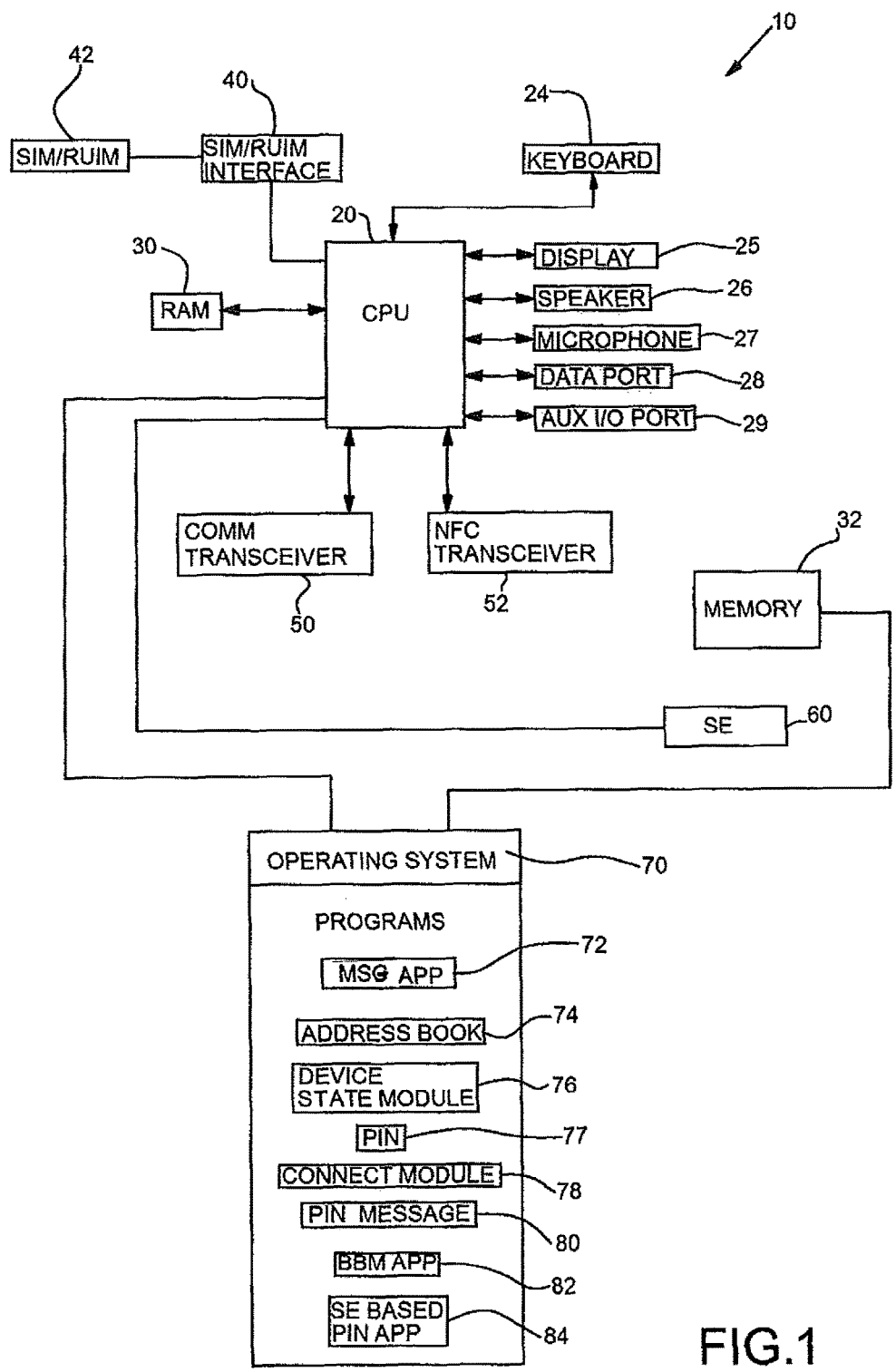
FIG. 1 is an illustrative embodiment of a mobile device 10 according to this disclosure.

FIG. 1 shows an illustrative embodiment of a mobile device 10 according to this disclosure. The mobile device may send and receive voice and data communications. Data communications that may be sent and received by the mobile device include electronic mailing ("e-mail"), text messaging ("SMS") and personal identification number messaging ("PIN"). Both E-mail and PIN messages include text and/or graphics and may be sent to one or more recipients. The e-mail and PIN messages are different though in terms of how recipients are indicated and how these messages are transmitted.

A recipient of an e-mail message may be specified using an e-mail address that can include a portion of a recipient's name. A recipient of a PIN message is specified using a PIN address, which is generally a number such as an 8 digit hexadecimal number (i.e. "200212F5"). Each mobile device 10 generally has an associated PIN address that is assigned at the time of manufacture and will often be embedded in a non-volatile memory onboard the mobile device 10. However, there can also be some situations in which the PIN address can be assigned at a later date to the mobile device 10. Similar to an e-mail address, a PIN address is unique but unlike an email address which is associated with a user, the PIN is associated with a particular mobile device 10 and so may be used as a way to identify one or more destination mobile devices to which a PIN message is to be sent. The mobile device 10 will allow for a PIN address to be entered into one or more address destination fields such as the "TO" address field. The method by which PIN message communication is handled by the wireless network is discussed in more detail below.

The manner in which e-mail and PIN messages are transmitted is also different. A transmission of an email message may be sent from a mobile device to another mobile device or a computer. The email message is sent over the internet by way of an email protocol. The message is delivered to a server which may alert the recipient device that a message has been received and will store the message for the recipient device until downloaded by the recipient mobile device or computer. In contrast, because a PIN is a unique number to each BlackBerry® device, a transmission of a PIN message may be sent only from one mobile device to another mobile device. In addition, a PIN message is not transmitted over the internet like an email message. Rather, a PIN message sent to a wireless network of the sending device is handed over to a RIM Relay 300 (shown in FIG. 3) which identifies the wireless network of the recipient mobile device. Once the wireless network is identified, the RIM Relay 300 hands the message over to the wireless network of the receiving device for delivery to the recipient mobile device.

Illustratively, the BlackBerry PIN network has been used for BlackBerry services while BlackBerrys were on the DataTac and Mobitex networks, and then from the first cellular-based BlackBerry operation. Two specific services were provided. PIN messaging (an email-type message, with the address being a PIN rather than the name@domain of email). BlackBerry messenger (BBM), and instant-messaging type of service. The PIN network is within the control of a single entity (Research In Motion, which is now BlackBerry). All PIN addresses are issued by BlackBerry: only BlackBerry mobile devices and mobile devices using BlackBerry-licensed software are provided with a PIN.

To describe in greater detail the structural make-up and functional operations of mobile device 10, reference is again made to FIG. 1 which shows a functional diagram of an example embodiment of mobile device 10. The mobile device 10 includes a number of components such as a central processor unit (CPU) 20 that controls the overall operation of the mobile device 10. Communication functions, including data and voice communications, are performed through a communication transceiver 50. The communication transceiver 50 receives messages from, and sends messages to, a wireless network 200 (shown in FIG. 2). In this example embodiment of the mobile device 10, the communication transceiver 50 is configured in accordance with the Global System for Mobile Communication (GSM) and General Packet Radio Services (GPRS) standards. The GSM/GPRS wireless network is used worldwide but may be superseded eventually by Enhanced Data GSM Environment (EDGE) and Universal Mobile Telecommunications Service (UMTS) or other new standards. It will be understood by persons skilled in the art that the illustrative embodiments described herein are not limited to the illustrated embodiment but is intended to be used with any other suitable standards that may be developed in the future.

Figure 2:
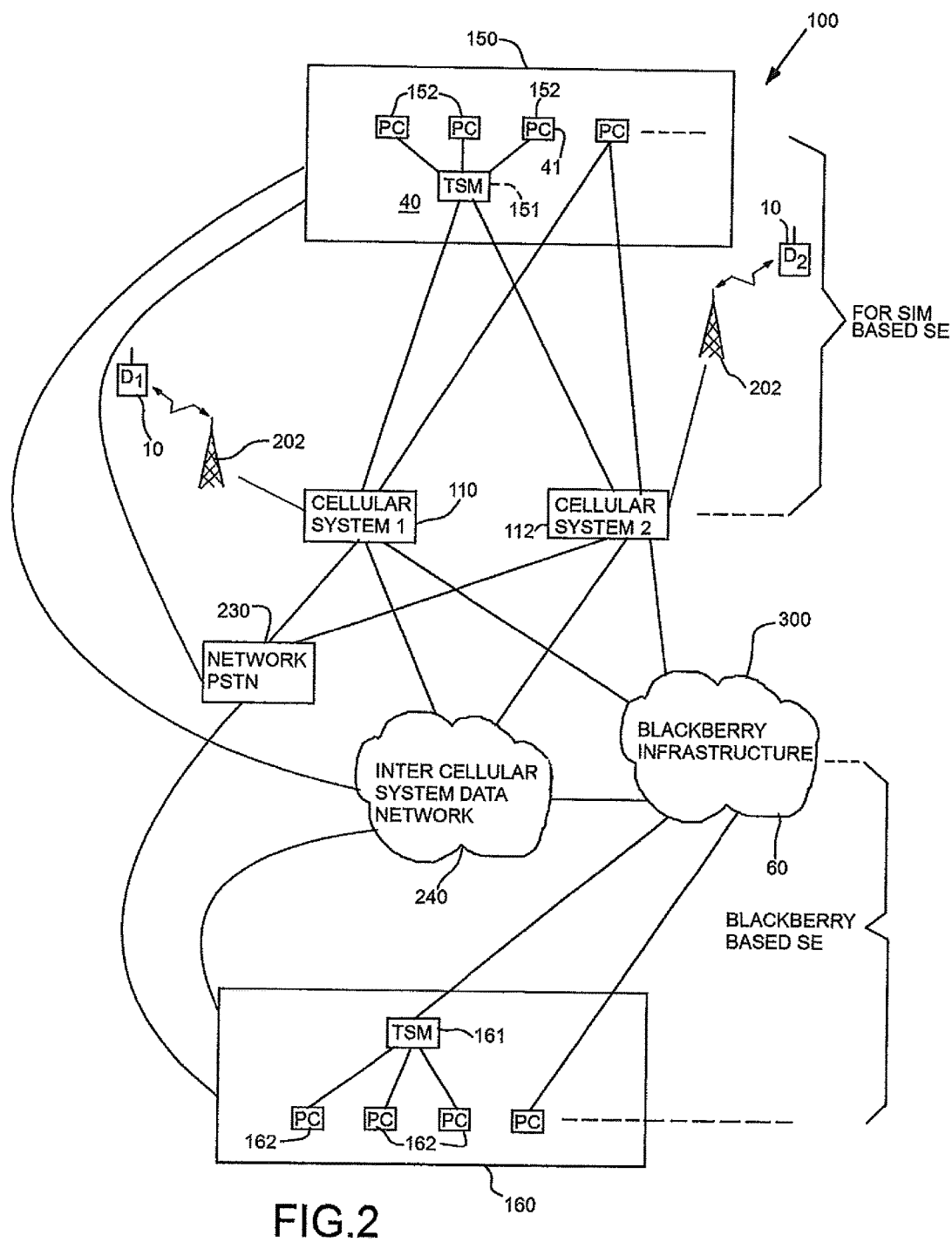
FIG. 2 is an illustrative embodiment of a wireless network 100 according to this disclosure.

Still referring to FIG. 1, an air interface (not shown) links wireless links mobile device 10 with the wireless network 100 (shown in FIG. 2). The wireless network represents one or more different Radio Frequency (RF) channels, operating according to defined protocols specified for GSM/GPRS communications. With newer network protocols, these channels are capable of supporting both circuit switched voice communications and packet switched data communications. Although the wireless network in the illustrative embodiment is GSM/GPRS, those who are skilled in the art appreciate that the different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above) and future third-generation (3G) networks like EDGE and UMTS, as well as fourth-generation networks. Some other examples of data-centric networks include IEEE-802.11, Mobitex™ and DataTAC™ network communication systems. Examples of other voice-centric data networks include Personal Communication Systems (PCS) networks like GSM and Time Division Multiple Access (TDMA) systems. Other network communication technologies that may be employed include, for example, Integrated Digital Enhanced Network (iDEN™), Evolution-Data Optimized (EV-DO), and High Speed Downlink Packet Access (HSDPA).

The CPU 20 may also interact with additional systems such as a Random Access Memory (RAM) 30, a flash memory 32, a display 25, an auxiliary input/output (I/O) 29, a data port 28, a keyboard 24, a speaker 26, a microphone 27, or other sub-systems, for example.

The mobile device 10 can send and receive communication signals over the wireless network after required network registration or activation procedures have been completed as described later in this disclosure. Network access is associated with a subscriber or user of the mobile device 10. To identify a subscriber, the mobile device 10 can use a SIM/RUIM card 42 (i.e. Subscriber Identity Module or a Removable User Identity Module) to be inserted into a SIM/RUIM interface 40 in order to communicate with a network. The SIM card or RUIM 42 is one type of a conventional "smart card" that can be used to identify a subscriber of the mobile device 10 and to personalize the mobile device 10, among other things. Without the SIM card 42, the mobile device 10 is not fully operational for communication with the wireless network. By inserting the SIM card/RUIM 42 into the SIM/RUIM interface 40, a subscriber can access all subscribed services. Services may include: web browsing and messaging such as e-mail, voice mail, Short Message Service (SMS), Personal Identification Number (PIN) messaging, and Multimedia Messaging Services (MMS). More advanced services may include: point of sale, field service and sales force automation. The SIM card/RUIM 42 includes a processor (not shown) and memory (not shown) for storing information. Once the SIM card/RUIM 42 is inserted into the SIM/RUIM interface 40, it is coupled to the CPU 20. In order to identify the subscriber, the SIM card/RUIM 42 can include some user parameters such as an International Mobile Subscriber Identity (IMSI). An advantage of using the SIM card/RUIM 42 is that a subscriber is not necessarily bound by any single physical mobile device. The SIM card/RUIM 42 may store additional subscriber information for a mobile device as well, including datebook (or calendar) information and recent call information. Alternatively, user identification information can also be programmed into the flash memory 32.

The SIM (subscriber identity module) (as used here) may be (according to 3GPP, and 3GPP2 for the RUIM) a SIM, ISIM, USIM or RUIM. The SIM is owned and controlled by the cellular operator; it is used within a mobile handset to store the subscription information and enable access to the mobile network.

In addition, there has been discussion of a software SIM, that is, the SIM functionality would be implemented as part of the handset using s separate secure element just for that function; it would not be removable from the handset. In this case, the secure element for NFC could be implemented as part of the "software SIM" or alternately as an entirely separate secure element as is described in this disclosure.

The mobile device 10 also includes an operating system 70 and software components 72, 74, 76, 77, 78. The operating system 70 and the software components that are executed by the CPU 20 are typically stored in a flash memory 32 which may alternatively be a read-only memory (ROM) or similar storage element (not shown). Those skilled in the art will appreciate that portions of the operating system 70 and the software components, such as specific device applications, or parts thereof, may be temporarily loaded into a volatile store such as the RAM 30. Other software components can also be included, as is well known to those skilled in the art.

The subset of software applications that control basic device operations, including data and voice communication applications, will normally be installed on the mobile device 10 during its manufacture. Other software applications include a message application 72 and a local address book application 74. The message application 72 can be any suitable software program that allows a user of the mobile device 10 to send and receive electronic messages. Various alternatives exist for the message application 70 as is well known to those skilled in the art. Messages that have been sent or received by the user are typically stored in the flash memory 32 of the mobile device 10 or some other suitable storage element in the mobile device 10. In at least some embodiments, some of the sent and received messages may be stored remotely from the device 10 such as in a data store of an associated host system that the mobile device 10 communicates with.

The local address book application 74 provides information for a list of contacts for the user. For a given contact in the address book 74, the information can include the name, phone number, work address and e-mail address of the contact, among other information. In some cases, the address book 74 can be provided by the message application 72. The software applications can further include a device state module 76, a Personal Information Manager (PIM) 77, and other suitable modules. The device state module 76 provides persistence, i.e. the device state module 76 ensures that important device data is stored in persistent memory, such as the flash memory 32, so that the data is not lost when the mobile device 10 is turned off or loses power. The PIM 77 includes functionality for organizing and managing data items of interest to the user, such as, but not limited to, e-mail, contacts, calendar events, voice mails, appointments, and task items. A PIM application has the ability to send and receive data items via the wireless network. PIM data items may be seamlessly integrated, synchronized, and updated via the wireless network with the mobile device subscriber's corresponding data items stored and/or associated with a host computer system. This functionality creates a mirrored host computer on the mobile device 10 with respect to such items. This can be particularly advantageous when the host computer system is the mobile device subscriber's office computer system.

The mobile device 10 also includes a connect module 78 that implements the communication protocols that are required for the mobile device 10 to communicate with the wireless infrastructure and any host system, such as an enterprise system, that the mobile device 10 is authorized to interface with. The connect module 78 includes a set of APIs that can be integrated with the mobile device 10 to allow the mobile device 10 to use any number of services associated with the host system. The connect module 78 allows the mobile device 10 to establish an end-to-end secure, authenticated communication pipe with the host system. Other types of software applications can also be installed on the mobile device 10. These software applications can be third party applications, which are added after the manufacture of the mobile device 10. Examples of third party applications include games, calculators, utilities, etc.

The mobile device 10 also includes a PIN message application 80 and a BBM application 82. PIN message application 80 includes functionality that allows messages to be sent from one mobile device to another mobile device using PIN numbers. The BBM application 82 includes functionality that allows for instant messaging between two or more devices. Illustratively, two forms of PIN-addressed communications have been used in the BlackBerry, by the BlackBerry users. The first is the BlackBerry Messenger (BBM)—an instant-messaging approach. The second is a PIN Message—of the style of email, but using the PIN of the addressee's BlackBerry as the destination address, rather than the address (name@domain) as used in email. Illustratively, in both cases, the PIN-addressed communications is from one BlackBerry to another BlackBerry. The PIN-addressed communications travels over the private PIN network (which operates over the cellular system) through servers operated by Research In Motion (now BlackBerry). The PIN network is only accessible by a BlackBerry, or by a mobile device operating with software licensed by Research In Motion (BlackBerry), which provides the licensed device with a unique PIN.

Advantageously, mobile device 10 further includes a secure element 60 and an SE based PIN message application 84. Illustratively, secure element 60 may be a secure memory element for storing user information such as account information and user information, such as payment instruments, certificates, keys, user accounts, and credentials. Illustratively, the SE 60 may be an electronic softcard, such as an electronic credit card, prepaid card, loyalty card, gift card, debit card, check card, or the like. The user information may include addresses used for shipping and billing, personal information such as purchasing/ordering preferences and others, and/or an electronic receipt of the transaction. Illustratively, the secure memory element is included in SIM card/RUIM 42. This allows the banks to retain control over sectors of the SIM card/RUIM 42 under an operating platform that is controlled by the carrier. Alternatively, the secure element may be provided by a separate chipset. The SE based PIN message application 84 is described in greater detail below.

Figure 4:
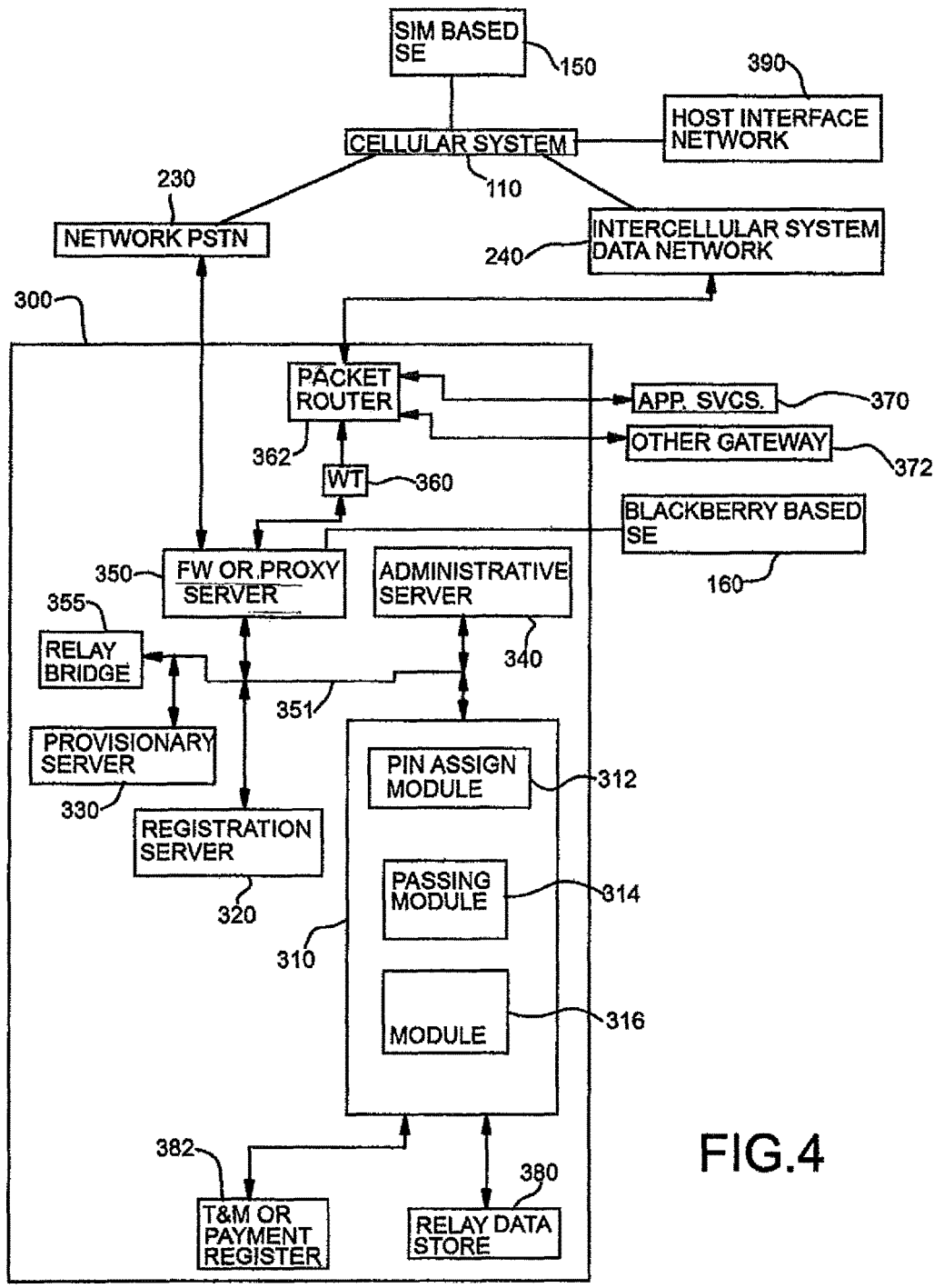
FIG. 4 is an illustrative embodiment of an RIM Relay 300 according to this disclosure.

FIG. 2 is an illustrative embodiment of an example implementation of a wireless network 100 comprising a first cellular system 110 and a second cellular system 112, a network PTSN 230, an inter-cellular system data network 240, a BlackBerry Infrastructure 300. Each of cellular system 110 and cellular system 112 is a conventional cellular system having one or more cellular towers 202 for broadcasting a communication footprint. The footprint enables mobile phones 10 that are located within the footprint to send messages to tower 202 and to receive messages from tower 202 provided that the mobile has the privileges to do so. These privileges are illustratively defined by contract between the mobile phone user and a carrier and typically include privileges such as whether the mobile phone user is permitted to place or receive predetermined calls from within that footprint. A discussion of how cellular system 110 and 112 operate is described in detail in connection with FIG. 4. As described in FIG. 4, illustratively, cellular system 110 and 112 are each a GSM network extended with GPRS capabilities. The privileges of the mobile device 10 also defines placing GSM network calls over switch based Network PSTN 230 or whether the mobile phone 10 may utilize GPRS services to place packet switched calls over the internet 240. The components, function, and operation of Network PSTN 230 and Internet 240 are well known in the art and so will not be further discussed here.

Still referring to FIG. 2, wireless network 100 further includes a SIM-based SE private network 150, a BlackBerry-based SE private network 160, or both. As shown in FIG. 2, a SIM-based SE private network 150 which includes a TSM server 151 and one or more personal computers (PCs) 152 that communicate within wireless network through a cellular system 110. A BlackBerry-based SE private network includes a TSM server 161 and one or more personal computers (PCs) 162 that communicate within wireless network 100 through Blackberry Infrastructure 300.

FIG. 2 further shows BlackBerry Infrastructure 300 which will be described in greater detail below.

Figure 3:
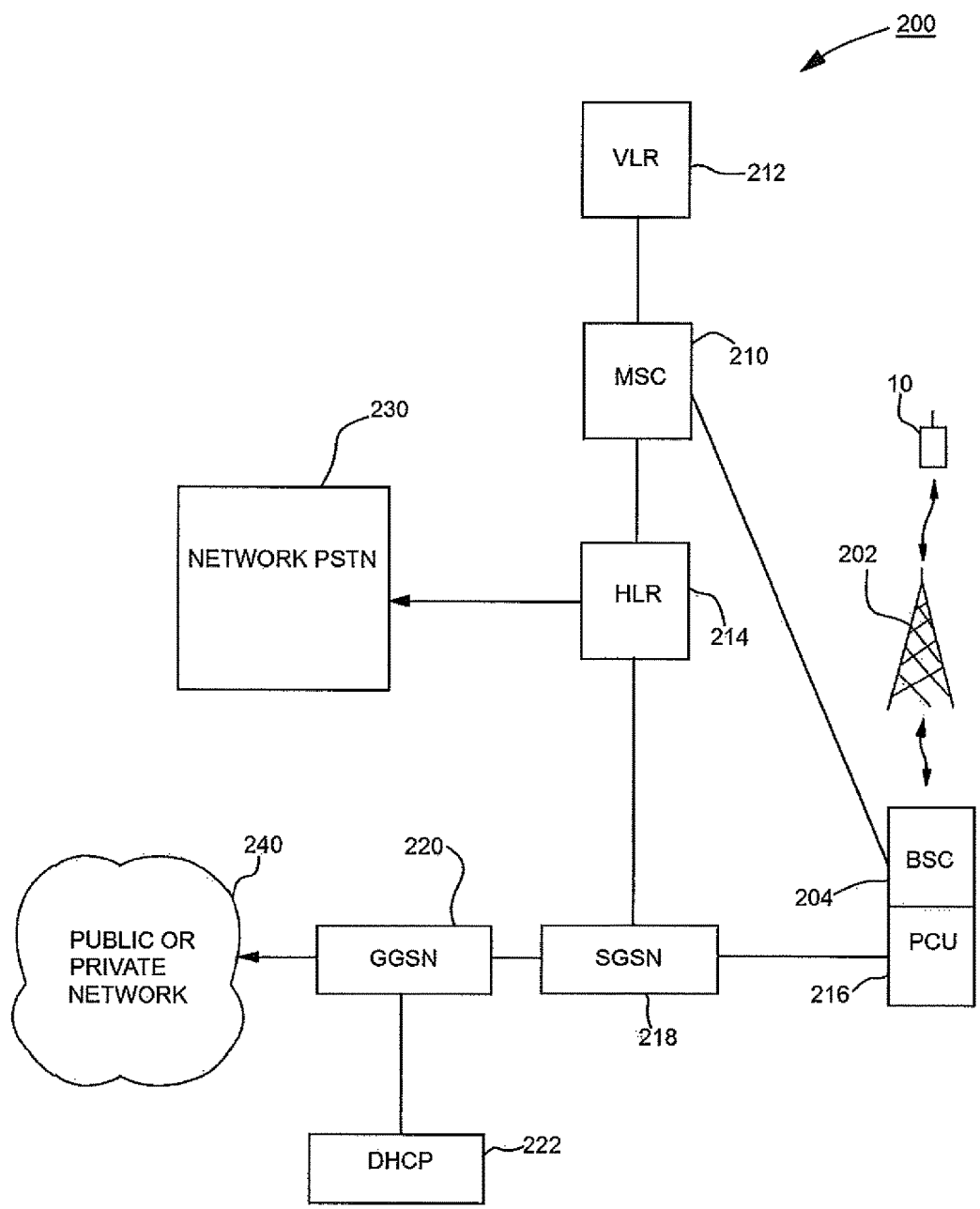
FIG. 3 is an illustrative embodiment of a node 200 of a cellular system 110 according to this disclosure.

FIG. 3 is an illustrative embodiment of an example implementation of a cellular system node 200 of the wireless network 100. The wireless network 100 comprises one or more nodes 200. In conjunction with the connect module 78 (shown in FIG. 1), the mobile device 10 can communicate with the node 200 within the wireless network 210. In this example embodiment, the node 200 is configured in accordance with General Packet Radio Service (GPRS) and Global Systems for Mobile (GSM) technologies. The node 200 includes a base station controller (BSC) 204 with an associated tower station 202, a Packet Control Unit (PCU) 216 added for GPRS support in GSM, a Mobile Switching Center (MSC) 210, a Home Location Register (HLR) 214, a Visitor Location Registry (VLR) 212, a Serving GPRS Support Node (SGSN) 218, a Gateway GPRS Support Node (GGSN) 220, and a Dynamic Host Configuration Protocol (DHCP) 222.

In a GSM network, the MSC 210 is coupled to the BSC 204 and to a landline network, such as a Public Switched Telephone Network (PSTN) 222 to satisfy circuit switched requirements. The connection through the PCU 216, SGSN 218 and GGSN 220 to the public or private network (Internet) 240 represents the data path for GPRS capable mobile devices. In a GSM network extended with GPRS capabilities, the BSC 204 also contains a Packet Control Unit (PCU) 216 that connects to the SGSN 218 to control segmentation, radio channel allocation and to satisfy packet switched requirements. To track the location of the mobile device 10 and availability for both circuit switched and packet switched management, the HLR 214 is shared between the MSC 210 and the SGSN 218. Access to the VLR 212 is controlled by the MSC 210.

The tower station 202 is a fixed transceiver station and together with the BSC 204 form fixed transceiver equipment. The fixed transceiver equipment provides wireless network coverage for a particular coverage area commonly referred to as a "cell" within the wireless network 100. The fixed transceiver equipment transmits communication signals to and receives communication signals from mobile devices within its cell via the tower station 202. The fixed transceiver equipment normally performs such functions as modulation and possibly encoding and/or encryption of signals to be transmitted to the mobile device 10 in accordance with particular, usually predetermined, communication protocols and parameters, under control of its controller. The fixed transceiver equipment similarly demodulates and possibly decodes and decrypts, if necessary, any communication signals received from mobile devices within its cell. Communication protocols and parameters may vary between different nodes. For example, one node may employ a different modulation scheme and operate at different frequencies than other nodes.

For every mobile device 100 registered with a specific wireless network 200, permanent configuration data such as a user profile is stored in the HLR 214. The HLR 214 also contains location information for each registered mobile device and can be queried to determine the current location of a mobile device within the fixed transceiver equipment's cell. The MSC 210 is responsible for a group of location areas and stores the data of the mobile devices currently in its area of responsibility in the VLR 212. Further the VLR 212 also contains information on mobile devices that are visiting other networks. The information in the VLR 212 includes part of the permanent mobile device data transmitted from the HLR 214 to the VLR 212 for faster access. By moving additional information from a remote HLR node to the VLR 212, the amount of traffic between these nodes can be reduced so that voice and data services can be provided with faster response times while at the same time requiring less use of computing resources.

The SGSN 218 and GGSN 2120 are elements added for GPRS support; namely packet switched data support within GSM. The SGSN 218 and MSC 210 have similar responsibilities within the wireless network 100 and can keep track of the location of each mobile device 10. The SGSN 218 also performs security functions and access control for data traffic on the wireless network 100. The GGSN 220 provides internetworking connections with external packet switched networks and connects to one or more of the SGSN's 218 via an Internet Protocol (IP) backbone network operated within the wireless network 100. During normal operations, a given mobile device 10 must perform a "GPRS Attach" to acquire an IP address and to access data services. This requirement is not present in circuit switched voice channels since Integrated Services Digital Network (ISDN) addresses are used for routing incoming and outgoing calls. Currently, all GPRS capable networks use private, dynamically assigned IP addresses, thus requiring the DHCP server 222 to be connected to the GGSN 220. There are many mechanisms for dynamic IP assignment, including using a combination of a Remote Authentication Dial-In User Service (RADIUS) server and a DHCP server. Once the GPRS Attach operation is complete, a logical connection is established from the mobile device 10, through the PCU 216 and the SGSN 218, to an Access Point Node (APN) (not shown) within the GGSN 220. The APN represents a logical end of an IP tunnel that can either access direct Internet compatible services or private network connections. The APN also represents a security mechanism for the wireless network 100, insofar as each mobile device 10 must be assigned to one or more APNs and mobile devices 10 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) contexts and there are a number of these available in the wireless network 100. To maximize use of the PDP contexts, the wireless network 100 will run an idle timer for each PDP context to determine if there is a lack of activity. When the mobile device 10 is not using its PDP context, the PDP context can be deallocated and the IP address returned to the IP address pool managed by the DHCP server 222.

To activate a phone, a user may call a carrier and provide the ESN, IMEI, or MEID number and model number of the phone that will have the service. The carrier will open an account for the user according to the requested services and then assign a phone number to the ESN, IMEI, or MEID number. The phone may be programmed with the phone number manually or over the air.

When a mobile device is powered on the IMSI or MIN of the mobile is sent to a network via an air interface. The mobile request to use the network is picked up by a base tower station. The call is directed to the message service center (MSC) that oversees the switching in which the mobile was powered on in. MSC determines whether mobile device is in its "home" area or whether it is a "visitor". MSC makes this determination based on the IMSI or MIN information. If in the home area, a home location register provides information necessary to handle both origination of a call and placement of a call. It does so based on service subscription information, service restrictions and supplementary information in home location register. If in a visitor area, visiting location register requests information from the home location register where mobile device is registered so that the visited system can process the call appropriately. If MSC determines that the mobile is authorized to use the network, MSC logs the mobile device onto the network and tells the mobile device it is logged on.

Once logged on, the user may send messages using either the public network or the Blackberry PIN. To send a message over the public network a user may dial a GSM mobile subscriber's MSISDN or a TIA network MIN, the call is sent to the MSN which interrogates HLR of the caller to obtain authorization and routing information stored in the service profile of the user associated with his MSISDN or MIN. MSC illustratively routes the call over a public switching telecommunications network (PSTN) to the HLR of the number called. Based on the IMSI or MIN number, the called HLR looks up the called subscriber profile as well as the current VLR at which the called subscriber is registered. The called HLR generates a response message and sends it back to the calling MSC. MSC then attempts to complete the call based on the location of the destination provided by called HLR.

To send a message using a PIN, a user may enter a destination PIN for a message. The PIN message that is uplinked to the wireless network is sent by the wireless network to a RIM Relay 300 shown in FIG. 4. The Rim Relay looks up the subscriber profile as well as the current VLR at which the destination PIN subscriber is registered. The Rim Relay then attempts to complete the sending of the message based on the location of the destination PIN.

As evident from the foregoing description, a PIN messaging system replaces the public HLR of the wireless device with the RIM Relay 300 as the home location registry of the device for purposes of the PIN messaging. This enables the RIM Relay to police the entire messaging between Blackberry devices. A description of how the RIM Relay does that now follows.

FIG. 4 shows an illustrative embodiment of RIM Relay 300 in accordance with this disclosure. FIG. 4 also shows how RIM Relay 300 may illustratively interconnect with Network PSTN 230, Intercellular System Data Network 240, cellular system 110, application services 370, other gateways 372. FIG. 4 further shows how RIM Relay 300 may illustratively interconnect with SIM-based SE 150 and BlackBerry-based SE 160. FIG. 4 additionally shows how RIM Relay 300 may be illustratively connected to a host system 390 which is typically a corporate office network or some other network, but in other alternative implementations may be a home office computer or some other private system. The host system includes a number of network components connected to each other by appropriate network connections such as LAN connections, for example. In the illustrative example, mobile device 10 is not affiliated with host enterprise network 390. In an alternate example, the host system 390 is an organization's network and the user of the mobile device 10 may have some sort of affiliation to the organization such as being an employee. In yet a further example, SIM-based SE 150 is configured as host enterprise network 390. The disclosure of the functional components and operation of Relay Site 300 in FIG. 4 shows how relay site 300, as a component of the wireless network 200, can be used to route messages between several associated mobile devices 10. Further, there can be several relay sites 300 (a relay site can also be referred to as a relay node). Typically, several mobile devices communicate wirelessly with the cellular system 110 or host system 390 through the relay site 300 and other nodes 200 of the wireless network 200. The other nodes 200 can be contained within the network 100. A carrier provider can provide the network 100.

Turning now to the operation of RIM Relay 300, the relay site 300 provides several major functional services including, but not limited to, routing services, authentication services and roaming services. Generally, the relay site 300 routes messages between the mobile devices 10 and the host system 390 as well as directly between the mobile devices 10 in some instances. In particular, the relay site 300 can identify destination information in messages sent from the mobile devices and route the messages to the appropriate system component or carrier network provider. The relay site 300 can provide connectivity between the mobile devices and various network services, regardless of the geographic location of the mobile devices and the respective carrier network providers. The relay site 300 can also exchange voice, data and/or control operations with the host system 390. The relay site 300 can also be connected with other relay sites (not shown).

RIM Relay 300 typically includes a firewall or proxy server 350, a network connection 351, one or more servers (shown as servers 310, 320, 330, 340), a relay data store 380 and a TSM or Payment Co. Registry 382; Wireless Transport (WT) interface 360 and a packet router 362; and a relay bridge 355. The relay site 300 may also include additional modules that interface with the relay data store 380 to provide functionality and operation that is independent of the host system 390. The relay site 300 can also include various components for ensuring that messages are properly sent to, and received from, the host system 390.

Firewall or proxy server 350 comprises components and operate in a manner that are well known in the art to protect RIM Relay 300 from malicious software. Network connection 351 may be a LAN connection for connecting the computing devices within the Rim Relay Site 300. The servers that may be included within the RIM Relay site 300 include a registration server 320, a provisioning server 330, and an administration server 340. For instance, the relay site 300 may also include monitoring components that control and monitor the routing functions performed by the relay site 300. The registration server 320 is mainly used in the registration process when the mobile device 10 is being used for the first time, when a new SIM card 42 is being placed into the SIM interface 40 of the mobile device 10, or when the user of a given mobile device 10 reregisters due to moving to a different wireless network coverage area. In some implementations, the location information of the registration server 320 may be stored locally in the mobile devices. When a particular mobile device 10 registers successfully, the registration server 320 can provide the location of the relay site 300, so that data can be sent between the particular mobile device 10 and the relay site 300. The registration server 320, which handles administration and registration services for the mobile devices 10, may also be provided with separate wireless transport and packet routing for interfacing with a given carrier network, although this is not specifically shown. New registration information for a new mobile device that is associated with the relay site or for an existing mobile device already associated with the relay site that has been updated can be recorded in the relay database 330 to ensure that the information is current. The registration server 320 can also be located remotely with respect to the relay site, and in some embodiments, the functionality of the registration server 320 can be provided by the enterprise server (not shown).

The provisioning server 330 may be used for setting up and managing various service providers (i.e. carrier networks), subscribers, mobile device manufacturers, resellers, and other entities in order to support any number of service and market differentiation requirements. The provisioning server 330 may include subscriber validation logic and stores information identifying the services that are enabled for a specific subscription for each user, i.e. for a specific SIM card 42. The provisioning server 330 receives this information from the registration server 320. In other implementations, the provisioning server 330 can be implemented remotely from, but still be connected to, the relay site 300.

The Administration Server 340 is a server that allows an administrator to manage the network including the settings in accordance with an organization's information technology (IT) policy.

In the illustrative embodiment, the individual server solutions are provided on individual computer hardware. However, the functions of two or more of these servers may be bundled into a single bundled solution provided on a single computer. Further, one or more of these servers may be implemented remotely from, but still be connected to, the relay site 300.

The Wireless Transport (WT) interface 360 and a packet router 362 may be collectively referred to as a network interface that connects the relay site 300 to various components of the wireless network 200 such as the intercellular system data network 240. The firewall or proxy server 350 further enables connection to the network PSTN. The relay site 300 can also include a relay bridge 355 which enables Relay Site 300 to query a related relay site when, for example, the Relay Site 300 finds match of PIN information of mobile device 10 in its Relay Data Store 380.

The wireless transport (WT) interface 360 enables Rim Relay 300 to connect with a wireless carrier network that provides network service to the mobile devices that communicate with the relay site 300. The WT interface 360 can communicate with a respective packet router 362 using TCP/IP links, in some implementations, which route data packets to and from respective wireless packet data service networks such as cellular system 110 through Intercellular System Data Network 240 and application services 370 or other gateways 372. The packet router 316 can provide accurate routing using the current IP address of a particular mobile device 10 for addressing a data packet. In addition, there can be multiple sets of WT interfaces 360 and packet routers 362 for servicing different carrier networks.

The application services 370 to which RIM Relay 300 may be connected to may include one or more of a mail server, a voice mail server, and the like. The voice-mail server allows users associated with the relay site 300 to receive voice-mail on mobile devices that support voice communication. The other gateways 372 to which RIM Relay 300 may be connected to may provide additional services such as, for example, an Internet gateway to allow users that access the relay site 300 to browse the Internet. Other examples of gateways include an Instant Messaging (IM) gateway, a Short Messaging Service (SMS) gateway, and the like. There can also be a generic service gateway (not shown) that can connect to additional gateways, such as a Multi-Media Service (MMS) gateway, to provide additional functionality. Communication between the relay site 300 and the application servers 370 and the other gateways 372 can be implemented using any suitable protocol, e.g., Server Relay Protocol (SRP), preferably over IP links.

The relay server 310 provides the main functionality for the relay site 300. The relay server 310 routes messages transmitted between the mobile devices 10. To facilitate PIN message routing, the relay server 310 can query the relay data store 380 to identify the recipient mobile device that matches a recipient PIN address. In some case, information pertaining to the MSISDN (Mobile Station International ISDN) or IMSI (International Mobile Subscriber Identity) number associated with a mobile device can be used to facilitate PIN message routing. The relay data store 380, as explained in more detail below, can include the MSISDN or IMSI information with respect to a mobile device 10. The relay data store 380 can also include subscription information for a particular user, as well as other information relating to the mobile device 10. In some implementations, the relay data store 380 can also store PIN messages that have been sent to devices associated with the relay site 300.

Within relay server 310 is a pin assignment module 312, a message handling module 314, and a user lookup module 316. The PIN assignment module 312 is optional and can be used to assign PINs to mobile devices 10 depending on certain situations. The user lookup module 316 can be used to lookup a user's information including PIN information by searching the relay data store 380. The message handling module 314 ensures that e-mail, PIN messages and "pseudo-PIN" messages are transmitted in a proper fashion. More specifically, the message handling module 316 distinguishes or discriminates between the messages based on message type (i.e. e-mail message, PIN message or "pseudo-pin" message) and takes the appropriate action based on message type. A "pseudo-pin" message is a PIN message that includes at least one e-mail address in an address field.

For instance, for an e-mail message, the message handling module 316 sends the e-mail message to the host system 390. For a PIN message, the message handling module 316 can send the PIN message to the mobile devices associated with the intended recipients of the PIN message. In some implementations, the message handling module 314 may verify the PIN addresses in the PIN message address fields. For a "pseudo-pin" message, the message handling module 314 can convert the "pseudo-pin" message to a standard PIN message and send the standard PIN message to the intended recipients.

In some implementations, the user lookup module 316 can also be used by the relay server 306 to perform a PIN information update in which PIN information contained in the relay data store 308 is used to update PIN information that is stored locally at a given mobile device.

In some implementations, the message handling module 314 can interact with the user lookup module 316 to obtain PIN information needed for a message that must be transmitted. For instance, the message handling module 314 can identify a message as a "pseudo-pin" message and can then interact with the user lookup module 316 to replace each e-mail address in the address fields of the "pseudo-pin" message with the corresponding PIN address, configure the "pseudo-pin" message as a standard PIN message and send the PIN message to the intended recipients.

Further, in some implementations, the message handling module 314 can be instructed or configured to check that the PIN addresses associated with a PIN message are current and up-to-date. Accordingly, the message handling module 314 can interact with the user lookup module 316 to verify that each PIN address is up-to-date, and if not then update the PIN addresses in the PIN message. In some implementations, the user lookup module 314 can also initiate a message that is sent to the mobile device that sent the PIN message, so that the old PIN addresses can be updated on the mobile device.

Generally the relay data store 380 can be considered to have relay information that includes e-mail address information, user information, and PIN information. The PIN information generally includes PIN address information and PIN date changed information for a given mobile device associated with the relay site 300. Alternatively, the relay data can be located (i.e. distributed) among a multiplicity of locations and databases. Advantageously, in either of these cases, the relay data is not located solely at a host or enterprise location, but rather as part of the infrastructure of the PIN messaging service provider, so that PIN and "pseudo-pin" messaging is implemented using an approach that is not dependent on the enterprise (i.e. customer) equipment. Therefore, the PIN messaging service is available at all times to perform PIN lookup and update functions.

The relay database 380 can be used to handle and manage location and device information, available services, authorization settings and other key operational parameters for all of the mobile devices that communicate with the relay site 300. In some cases, the location and device information can be indexed by the PIN address indicia of these mobile devices, which may be programmed into the mobile devices 10 at the time of manufacture or dynamically assigned afterwards. The information can also be indexed by the user's name or e-mail address. The location information can include the last known location for each mobile device. The relay data store 308 may also be accessed by other services and network components that are able to access the system 250 through gateways, other wireless networks.

Advantageously, the relay TSM or Payment Company Registry 380 can be used to handle and manage location and device information, available services, authorization settings and other key operational parameters for all of the TSM or Payment Company devices that communicate with the relay site 300. In some cases, the location and device information can be indexed by the PIN address indicia of the mobile devices that subscribe to the services of the TSM or Payment Company, which may be programmed into the mobile devices 10 at the time of manufacture or dynamically assigned afterwards. The information can also be indexed by the TSM or Payment Company's name or e-mail address. The TSM or Payment Company Registry 382 may also be accessed by the TSM and Payment Company that are able to access the system 300 through gateways, other wireless networks.

FIG. 5 is an illustrative embodiment of certain fields of a relay database data store 380 and TSM registry 382 that a trusted relay server 300 may use according to this disclosure. The fields of the relay database 380 and TSM or Payment Co. Registry 382 may include an e-mail address field 402, a PIN address field 404, a PIN date changed field 406, a Subscription Information field 408, a SIM Info field 410, an IMEI info field 412, a name field 414, and a location field 416. Advantageously, the fields of the TSM or Payment Co. Registry 382 may further include a TSM address field 418, a TSM address date changed field 420, and a TSM info field 422. The relay database 380 and TSM or Payment Co. Registry 382 may be searched based on at least a portion of a user's e-mail address, name or PIN address. Searching the relay database 380 and TSM or Payment Co. Registry 382 by PIN address allows one to determine when that PIN address was entered into the corresponding database record or updated. In alternative illustrative embodiments, some of these fields may be optional and/or include additional fields. For instance, a field may be provided for messages so that if a particular mobile device is out of coverage or has been switched off and thus messages cannot be immediately sent to the mobile device, these messages can be stored in the relay data store 380 or TSM or Payment Co. registry 382.

As previously described, the message handling module 314 ensures that e-mail, PIN messages and "pseudo-PIN" messages are transmitted in a proper fashion. More specifically, the message handling module 314 distinguishes or discriminates between the messages based on message type (i.e. e-mail message, PIN message or "pseudo-pin" message) and takes the appropriate action based on message type. A "pseudo-pin" message is a PIN message that includes at least one e-mail address in an address field. For instance, for an e-mail message, the message handling module 314 sends the e-mail message to the host system 30. For a PIN message, the message handling module 314 can send the PIN message to the mobile devices associated with the intended recipients of the PIN message. In some implementations, the message handling module 314 may verify the PIN addresses in the PIN message address fields. For a "pseudo-pin" message, the message handling module 326 can convert the "pseudo-pin" message to a standard PIN message and send the standard PIN message to the intended recipients.

Figure 6A:
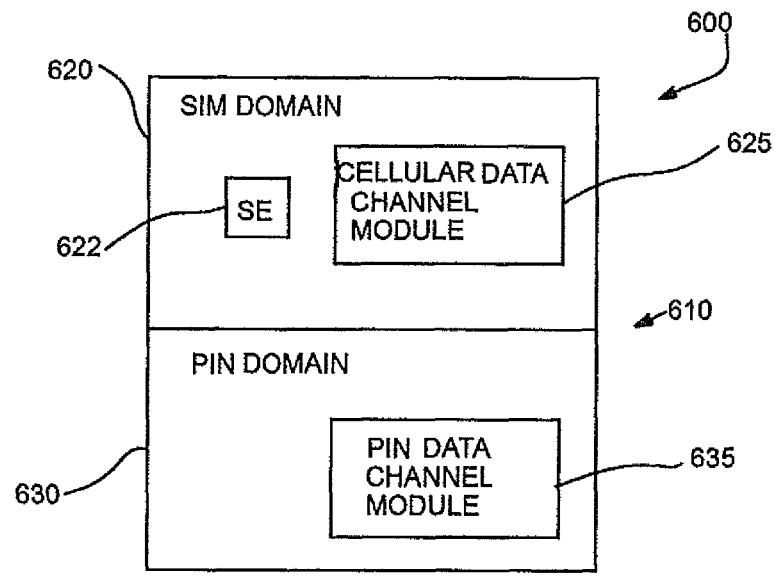
FIGS. 6A, 6B illustrate a mobile terminal with and without the SE of this disclosure.
Figure 6B:
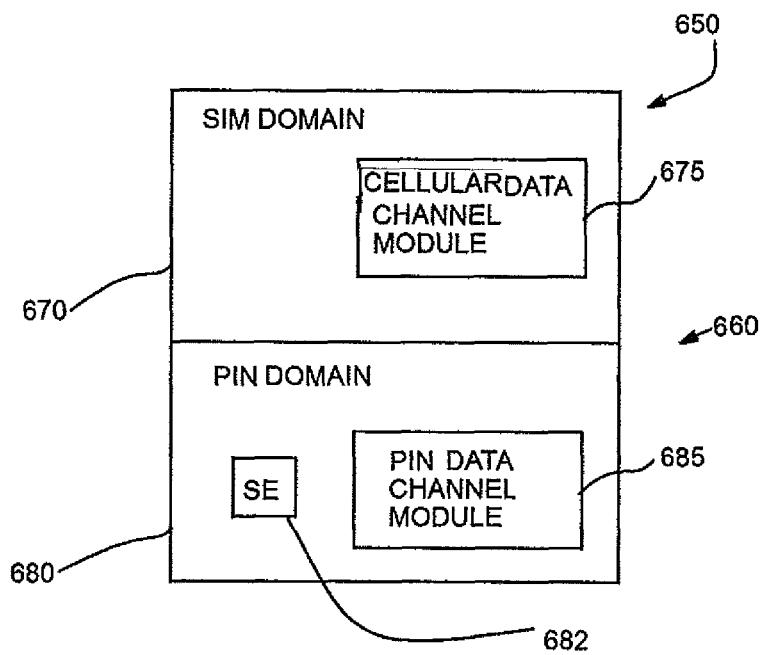

In contrast to the use of an SE within the SIM, this disclosure provides. the SE as part of the mobile device, rather than within the SIM. In an illustrative embodiment, a BlackBerry PIN network is used to illustrate this disclosure; although any PIN network may also be used. In the BlackBerry PIN network, the communications link between the card issuer or TSM and the SE will be carried between the BlackBerry server and the mobile device over the BlackBerry PIN network FIGS. 6A, 6B illustrate a mobile terminal with and without the SE of this disclosure. FIG. 6A shows a mobile terminal 610 operating in a communication system 600. The mobile terminal includes two domains of communication comprising a communication in the SIM domain 620 and a communication over a PIN domain 630.

In the SIM domain, communication is taking place between a SIM card residing in the mobile terminal and an MST, etc. that form the backbone of the cellular data communication network. The SIM domain communication occurs over cellular data communication channels that are established by the service provider that owns the SIM card with a cellular data channel module 625 residing in the SIM domain of the mobile terminal. The cellular data channels are established by the service provider over the cellular systems involving MSC's, VLR's, etc. all as described in FIGS. 2 and 3 above.

In the PIN domain, communication is taking place between PIN firmware that enables and hence largely constitutes the mobile terminal. As used herein, the term "PIN domain" refers to the "PIN network." As previously described, the PIN number is the associated PIN address that is assigned at the time of manufacture and will often be embedded in a non-volatile memory onboard the mobile device 10. Unlike the SIM address which goes wherever the SIM card is taken, the PIN address stays with the mobile terminal essentially for life. In this sense, the PIN address can be thought of as being a part of the DNA of the mobile terminal; unlike the SIM address which is more akin to an article of clothing in the form of a SIM card, worn by whichever mobile terminal the SIM card is inserted into.

In the PIN domain, communication occurs over PIN data communication channels that are established by the service provider that owns the PIN address with a PIN data channel module 635 residing in the PIN domain of the mobile terminal. The PIN data channels are established by the service provider over data systems illustratively involving SGSN, GGSN, etc. as described in FIG. 3 above. In FIG. 6A, the SE 622 resides in the SIM domain. Hence, all messaging between the mobile terminal and the TSM for effective secure transactions as previously described all occurs in the SIM domain over PIN data communication channels.

FIG. 6B shows a mobile terminal 660 in a system 650 configured according to this disclosure. In FIG. 6B, mobile terminal 660 includes both a SIM domain 670 and a PIN domain 680 like the mobile terminal 620 of FIG. 6A. SIM cellular communication channels with the service providers owning the SIM card of the mobile terminal are established with cellular data channel module 675 in a like manner as similar module described in FIG. 6A. In addition PIN data channels established with the service provider owning the PIN address of the mobile terminal are established with PIN data channel module 685 in a like manner as similar module described in FIG. 6B. Unlike in FIG. 6A, where the SE 622 resides in the SIM domain, thereby requiring any messaging between a TSM and the SE to occur in a SIM domain over cellular data channels operated by the owner of the SIM card driving the mobile terminal, the SE 682 of this disclosure resides in the PIN domain 680 of the mobile terminal. Hence, the SE of this disclosure advantageously allows for messaging to occur over the PIN data channel operated by the owner of the PIN address.

In other words, this disclosure enables SE transactions to be conducted more securely because they may be conducted over PIN communication channels that are typically established and operated under the complete control of the provider that owns the PIN address. No longer do SE transactions need to take place in the SIM domain which may involve communication through cellular data channels that are shared between service providers.

Illustratively, the mobile, handset, mobile handset, mobile device, mobile station, or mobile phone (also known as a cellular phone, cell phone and a handset), and within 3GPP as a UE (User equipment), is used as a general term for the mobile handset. In this disclosure, the differentiation made in TS 21.905 and elsewhere is not made. The SE features for use with this or other handsets are as explained in this disclosure.

Figure 7:
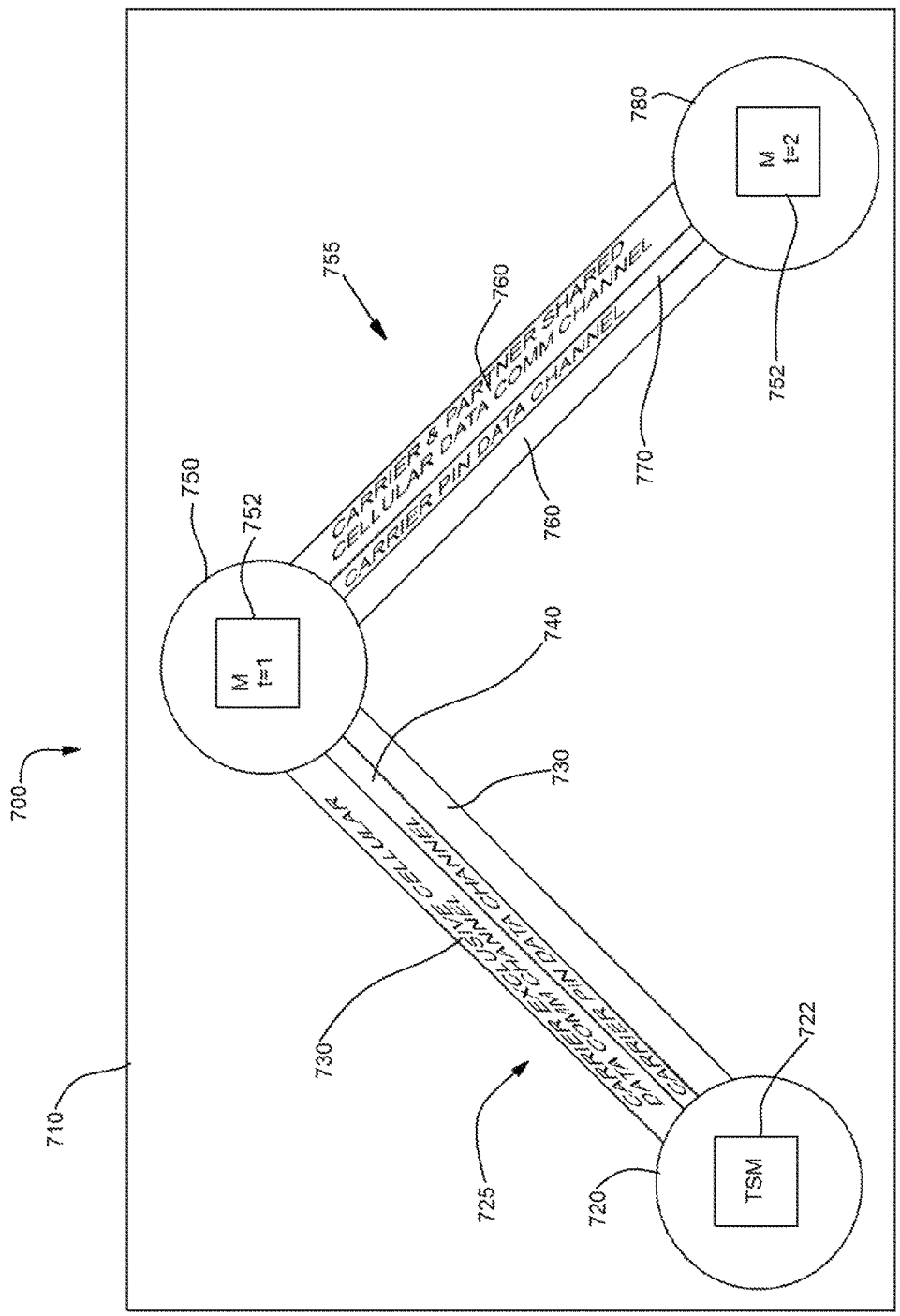
FIG. 7 illustrates a system between TSM and a mobile terminal illustrating the enhanced SE transactions made possible by this disclosure.

FIG. 7 illustrates one way in which conducting SE transactions with mobile terminals may be made more secure according to this disclosure. There are other ways in which this disclosure enhances SE transactions with mobile terminals. FIG. 7 shows a geographical domain 700 comprising three nodes 720, 750, and 780 that may communicate between themselves in the manner illustrated through communication channels 725, 755. Communication channel 725 established between nodes 720 and 750 comprises a cellular data communication channel 730 and a PIN data channel 740. Similarly, communication channel 755 established between node 750 and 780 comprises a cellular data communication channel 760 and a PIN data channel 770. A TSM 722 is located in node 720 and a mobile terminal 752 is located in node 750 at time t=1 and in node 780 at time t=2.

The difference between communication channels 725 and 755 is that in communication channel 725, the carrier that owns the SIM card residing in terminal 752 in node 750 at time t=1 and the PIN data channel 740 also owns the cellular data communication channel 730. In communication channel 755, the carrier that owns the SIM card residing in terminal 752 residing in node 780 at time t=2 and the PIN data channel 770 does not exclusively own the cellular data communication channel. Rather, the carrier shares that cellular data communication channel with another carrier who may be providing roaming services, for example, for the carrier owning the SIM card. In conducting SE transactions over cellular data communication channel 725, the SE transactions are conducted under heightened security given that the carrier that owns the SIM card of mobile terminal 752 also owns and operates the cellular data communication channel. On the other hand, there is less security in the SE transactions that are conducted between the TSM and the mobile terminal when the mobile terminal has moved to node 780 over communication channel 760. This is because the carrier that owns the SIM card of the mobile terminal cannot completely control those SE communications for the TSM since the carrier is sharing communication channel 755 with another carrier.

The situation with a shared cellular data channel may arise when the SE is in the SIM and the user (when traveling to a different country) cannot change the SIM quickly and easily to make use of a local SIM to eliminate the need for roaming and reduce expenses. The use of a SE that is part of the mobile device as taught by this disclosure, together with the use of the mobile device's PIN as an address for messages (data) sent to the SE, permits the user to easily change the SIM and still use SE for secure transactions since the SE stays with the mobile terminal and so is unchanged despite the change in SIM card. The TSM may continue to communicate with the SE that has stayed with the mobile terminal even though the mobile terminal is operating with a new SIM card. The need for the change in SIM card is that in a different country there may be a different cellular operator who requires his own SIM card to be used. In other words, in the mobile terminal of this disclosure, the SE will stay the same even though the SIM changes, and the mobile number (IMSI) will also be changed.

Figure 8:
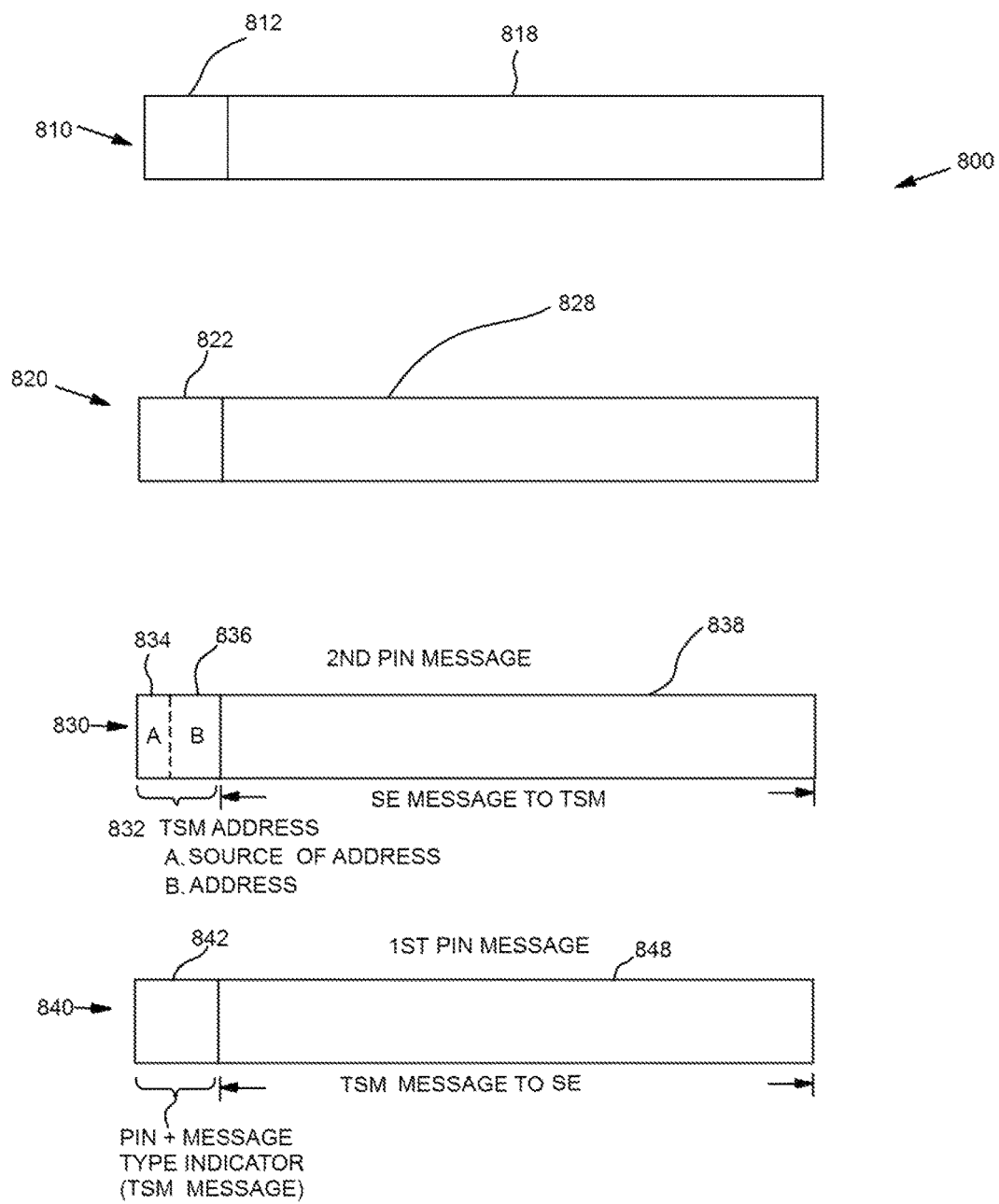
FIG. 8 is an illustrative embodiment of messaging protocols, including messaging protocol 630, 640 according to this disclosure.

FIG. 8 is an illustrative embodiment of messaging protocols for PIN messaging, including messaging protocol 630, 640 according to this disclosure for communication between a mobile device and a trusted service manager. More specifically, FIG. 8 shows four messaging architecture 810, 820, 830, and 840 of which messaging architecture 810 and 820 illustrate the architecture for PIN messages that are conventionally transmitted between mobile devices. Even more specifically, messaging architecture 810 shows a first PIN message that mobile device 10 may send to a second mobile device (not shown). Messaging architecture 820 shows a second Pin message that the second mobile device may return to mobile device 10 in response to the first PIN message; or alternatively, a new PIN message that a second mobile device may want to send to mobile device 10 or another mobile device in the network. As shown, messaging architecture 810 and 820 each have a header field 812 and header field 822, respectively; and each messaging architecture has a message field 818 and message field 828, respectively.

Using messaging architecture 810 as an example, although messaging architecture 820 will operate in much the same way, the header field 812 of messaging architecture 810 is intended for receiving a PIN number of the intended recipient while message field 818 is intended for receiving the message intended to be sent to the intended recipient mobile device.

A mobile device user wishing to send a PIN message will call up an application program (not shown) in mobile device 10 that provides the graphical user interface that allows the user to enter the PIN number and message information into the mobile device 10 in a manner in which the mobile device will recognize the entered data. Specifically, the mobile device 10 will allow for a PIN address to be entered into one or more address destination fields such as the "TO" address field that may appear on display 25 of the mobile device 10. The mobile device 10 will also allow for a message to be entered into a message field that may also appear on display 25 of the mobile device. An application program (not shown) which may be part of the graphical user interface or be a separate application, will translate the data entered by the user into a data transmission format that comports with a PIN transmission protocol such that the PIN message may be recognized by both the network that the mobile device is operating within as well as the mobile device receiving the transmitted message.

Once the data has been entered through the graphical user and translated by the application program, the PIN message is ready for transmission. On depressing the send button on the mobile device 10, the entered PIN message is transmitted from mobile device 10 to the wireless network of the mobile device 10. At the wireless network, the network will parse the fields that make up the message and look at the header field. From the data in the header field, the network will distinguish the message to be a PIN message, and hand the message over to RIM Relay 300 for further processing according to PIN messaging protocol.

At the RIM Relay 300, the message handling module 314 ensures that the PIN message, along with e-mail and "pseudo-PIN" messages received, are transmitted in a proper fashion. More specifically, the message handling module 316 will distinguish or discriminate between the messages based on message type (i.e. e-mail message, PIN message or "pseudo-pin" message) and after determining the instant message to be a PIN message, message handling module 316 will take the action that is appropriate for a PIN message. More specifically, using the PIN address appearing in the header field as the intended recipient, the RIM Relay 300 will reference to Relay Data Store 380 to locate the mobile device bearing that PIN number. The Relay Data Store 380 contains the PIN number, location and device information, available services, authorization settings and other key operational parameters for the mobile devices that communicate with the relay site 300. Once the recipient mobile device bearing the PIN number of the intended recipient is located and the wireless network in which it is operating in is identified, the RIM Relay 300 will hand the PIN message over to wireless network of the intended recipient for delivery to the recipient mobile device; where the recipient mobile device may read the message.

Advantageously, this disclosure provides for a new messaging architecture for providing more secure messaging. The new messaging architecture enhances the security of a message involving SE embedded data between a mobile device and a trusted service manager (TSM) or payment company (PC) over a network. The new messaging architecture allows broadcasted messages (such as NFC broadcasted messages) involving SE embedded data that are transmitted over a network even more secure.

The new messaging architecture is shown in FIG. 8 as messaging architecture 830 and 840. More specifically, messaging architecture 830 shows a messaging architecture for transmitting SE embedded data from mobile device 10 to a TSM. Messaging architecture 840 shows a messaging architecture for transmitting a message from a TSM to a mobile device having an SE.

Message architecture 830 comprises a header field 832 and a message field 838. Header field 832 includes an SE address 834, which is the PIN address of mobile device 10. The header field 832 further includes a destination field 836, which is the address of a TSM having payment instruments, certificates, keys, user accounts, and credentials for the SE located at SE address 834. Message field 838 includes a message that is enabled for transmission by mobile device 10 by SE. Advantageously, the use of a PIN address in header field 832 of messaging architecture 830 ensures that the message will be processed by the network in accordance with the PIN messaging protocol.

More particularly, a mobile device user wishing to send a message to a TSM will call up an application program (not shown) in mobile device 10 that provides the graphical user interface that allows the user to enter the PIN number required for header field 834. The GUI also allows the user to enter the address of the TSM and the message information to be sent to the TSM. All of this data entry into the mobile device 10 is transformed by application into a format recognizable by the mobile device. Specifically, the mobile device 10 will allow for a source PIN address to be entered into header source field 834 and will allow the TSM address to be entered into the header destination field 836 such as the "TO" address field that may appear on display 25 of the mobile device 10. The mobile device 10 will also allow for a message to be entered into a message field that may also appear on display 25 of the mobile device. An application program (not shown) which may be part of the graphical user interface or be a separate application, will translate the data entered by the user into a data transmission format that comports with a PIN transmission protocol such that the message will be recognized as a PIN message by the network that the mobile device is operating.

Once the data has been entered through the graphical user and translated by the application program, the PIN message is ready for transmission to the TSM. On depressing the send button on the mobile device 10, the entered PIN message is transmitted from mobile device 10 to the wireless network of the mobile device 10. At the wireless network, the network will parse the fields that make up the message and look at the header field. From the data in the header field, the network will distinguish the message to be a PIN message, and hand the message over to RIM Relay 300 for further processing according to messaging protocol.

At the RIM Relay 300, the message handling module 314 ensures that the PIN message, along with e-mail and "pseudo-PIN" messages received, are transmitted in a proper fashion. More specifically, the message handling module 316 will distinguish or discriminate between the messages based on message type (i.e. e-mail message, PIN message or "pseudo-pin" message) and after determining the instant message to be a PIN message, message handling module 316 will take the action that is appropriate for a PIN message that includes a destination field 836 in the header field 832. More specifically, using the destination address appearing in the header field as the intended TSM recipient, the RIM Relay 300 will reference TSM Registry 382 to locate the TSM bearing that destination address. The TSM Registry 382 contains the number, location and device information, available services, authorization settings and other key operational parameters for the TSMs that may communicate with the relay site 300. Once the recipient TSM bearing the destination address of the intended recipient is located and the wireless network in which it is operating in is identified, the RIM Relay 300 will hand the PIN message over to the network of the intended TSM recipient for delivery to the recipient TSM; where the recipient TSM may read the message.

Advantageously, messaging architecture 840 shows a messaging architecture for transmitting a message from a TSM to a mobile device having an SE also as a PIN message. Message architecture 840 comprises a header field 842 and a message field 848. Header field 842 includes a PIN field 842, which is the PIN address of mobile device 10. Message field 848 includes a message that is enabled for transmission to mobile device 10 through SE. Advantageously, the use of a PIN address in header field 842 of messaging architecture 840 ensures that the message will be processed by the network in accordance with the PIN messaging protocol.

More particularly, a TSM sending a message to a mobile device 10 will call up an application program (not shown) in the device of the TSM (not shown) that provides the graphical user interface that allows the TSM to enter the PIN number required for header field 844. The GUI also allows the TSM to enter the message information to be sent to the mobile device. All of this data entry into the TSM transmitting device (not shown) is transformed by application into a format recognizable by the TSM equipment. Specifically, the TSM equipment will allow for a source PIN address to be entered into header source field 844 such as the "TO" address field that may appear on a display (not shown) of the TSM equipment. An application program (not shown) which may be part of the graphical user interface or be a separate application, will translate the data entered by the TSM into a data transmission format that comports with a PIN transmission protocol such that the message will be recognized as a PIN message by the network that the TSN is operating in.

Once the data has been entered through the graphical user and translated by the application program, the PIN message is ready for transmission by the TSM. On depressing the send button on the TSM equipment, the entered PIN message is transmitted from the TSM to the wireless network of the TSM. At the wireless network, the network will parse the fields that make up the message and look at the header field. From the data in the header field, the network will distinguish the message to be a PIN message, and hand the message over to RIM Relay 300 for further processing according to messaging protocol.

At the RIM Relay 300, the message handling module 314 ensures that the PIN message, along with e-mail and "pseudo-PIN" messages received, are transmitted in a proper fashion. More specifically, the message handling module 316 will distinguish or discriminate between the messages based on message type (i.e. e-mail message, PIN message or "pseudo-pin" message) and after determining the instant message to be a PIN message, message handling module 316 will take the action that is appropriate for a PIN message that includes a destination field 836 in the header field 632. More specifically, using the PIN number appearing in the header field as the intended mobile device recipient, the RIM Relay 300 will reference data store 380 to locate the mobile device 10 bearing that PIN number. The data store 380 contains the number, location and device information, available services, authorization settings and other key operational parameters for the mobile devices that may communicate with the relay site 300. Once the recipient mobile device bearing the PIN number of the intended recipient is located and the wireless network in which it is operating in is identified, the RIM Relay 300 will hand the PIN message over to the network of the intended mobile phone recipient for delivery to the recipient mobile phone; where the recipient mobile phone may read the message.

INDUSTRIAL APPLICABILITY

The industrial applicability of the messaging control device, system, and method of this disclosure is in facilitating communication of a message involving SE embedded data between a mobile device and a trusted service manager (TSM) or payment company (PC) over a network.

Figure 9:
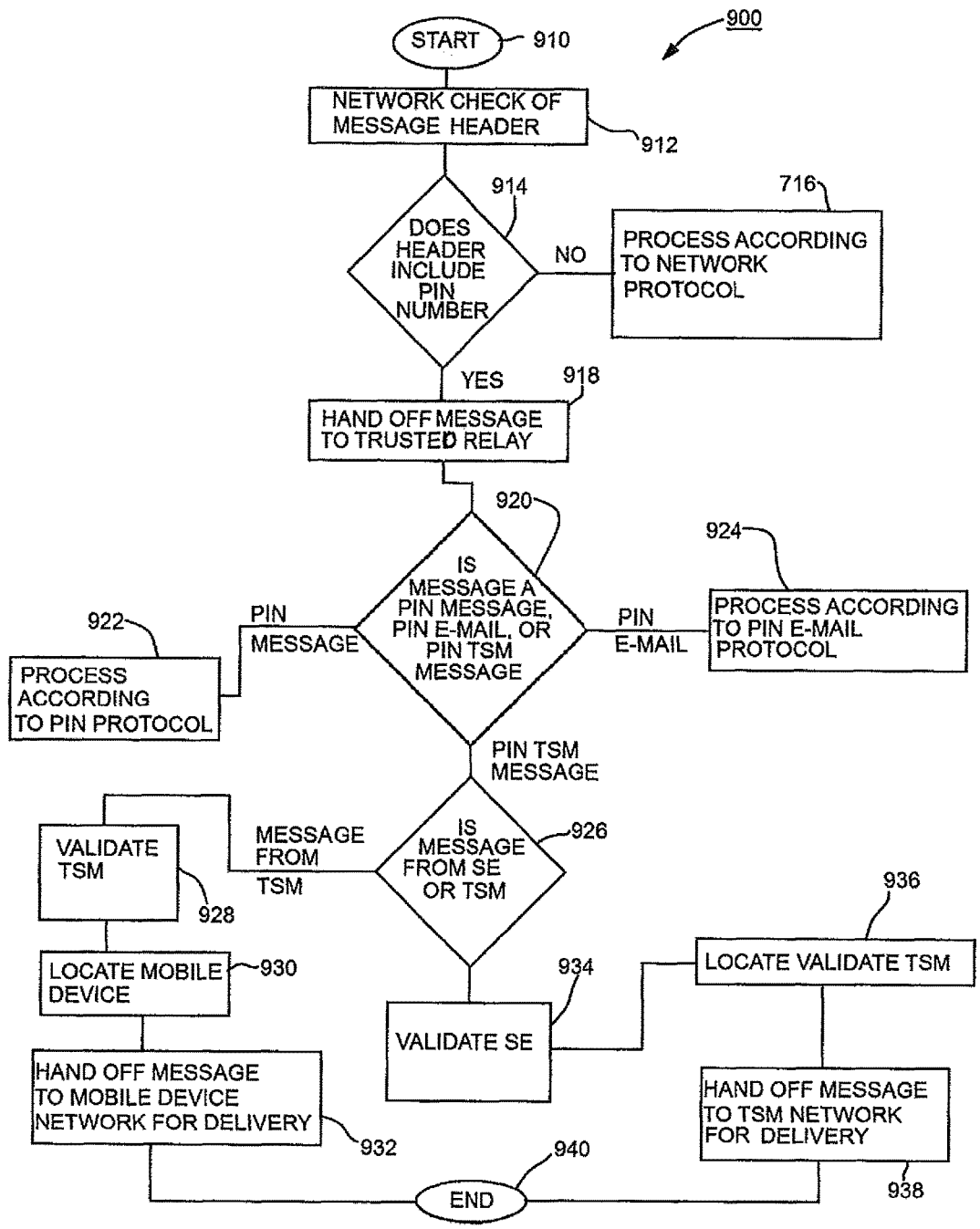
FIG. 9 is a flow chart illustrating an example operation of an illustrative embodiment of this disclosure.

FIG. 9 is a flow chart illustrating an example embodiment of this disclosure. The process starts at step 910 and advances to step 912 where the network parses the message into fields and checks the header field of the message. At step 914 the network determines whether the header field includes a PIN number. If the header does not include a PIN number, at step 716 the network processes the message according to network protocol. If the header includes a PIN number, at step 918 the network hands the message over to RIM Relay 300. At step 920 the message handling module 314 determines whether the PIN message is a PIN message, a PIN email, or a PIN TSM message. A PIN email message is sent to step 924 for processing according to PIN email protocol. A PIN message is sent to step 922 for processing according to PIN message protocol. Advantageously, a PIN TSM message is sent to step 926 where the message handling module 314 determines whether the message is from a mobile device SE or from a trusted service manager. If the message is from a trusted service manager, the process advances to step 928 where the trusted relay 300 validates the credentials of the trusted service manager using the TSM registry 382 at step 928. The process then advances to step 930 where the PIN number from the header field is used to identify and locate the mobile device associated with that PIN number. Once the network of the mobile device has been located, at step 932 the trusted relay 300 hands the message off to the network of the mobile device for delivery to the mobile device after which the process ends at step 940. If at step 926 the message handling module 314 determines the message if from a TSM, the process advances to step 934 where the trusted relay validates the SE credentials of the mobile device associated with the PIN number of the source located in the header. At step 936, using the destination address found in the header, the trusted relay locates the trusted service manager after which the trusted relay 300 hands the message off to the network of the trusted service manager for delivery to the trusted service manager.

Figure 10:
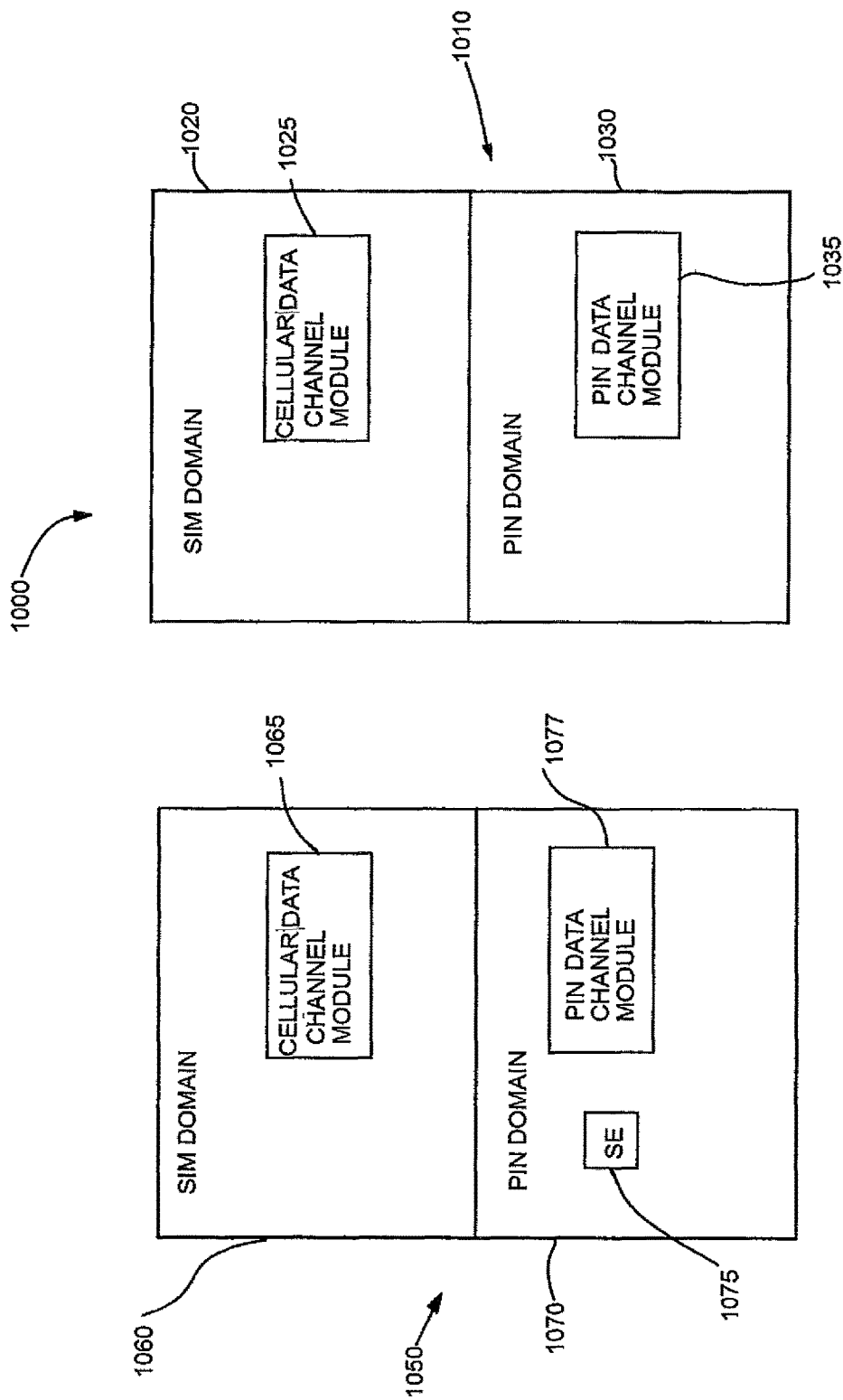
FIGS. 10, 11 are further illustrative embodiments showing how SE transactions may be made even more secure using the teachings of this disclosure.

FIG. 10 shows another illustrative advantage of conducting SE transactions in the PIN domain according to this disclosure. FIG. 10 shows a system 1000 comprising a server 1010 and a mobile terminal 1050. As shown in FIG. 10, each of server and mobile terminal are configured to operate in a SIM domain 1020, 1060, respectively. In the SIM domain, each of server and mobile terminal are provided with a cellular data channel module 1025, 1065, respectively. In addition, mobile terminal 1050 is configured to operate in the PIN domain 1070, being provided with a PIN and a PIN data channel module 1077 for communication as previously described.

In FIG. 10, mobile terminal 1050 is advantageously provided with an SE 1075 in the PIN domain of the mobile terminal according to this disclosure to enhance the security of SE transactions with a TSM as described above in FIGS. 6A, 6b, 7. In additional, server 1010 is also advantageously provided with a PIN (not shown) and a Pin data channel module 1035 which enables the server to also send and receive messages from and to the mobile terminal at the PIN domain level, adding even more security to SE transactions with mobile terminals according to this disclosure. In this embodiment, SE transactions between the server and the mobile terminal occur at the PIN domain level on both the mobile terminal end and the server end, thereby heightening security. In other words, the mobile terminal and the server are communicating between the PIN domain of the server and the PIN domain of the mobile terminal in effecting SE transactions in the embodiment of FIG. 10. It is possible for the entire SE transaction to occur in the more secure PIN domain in the example shown in FIG. 10.

Figure 11:
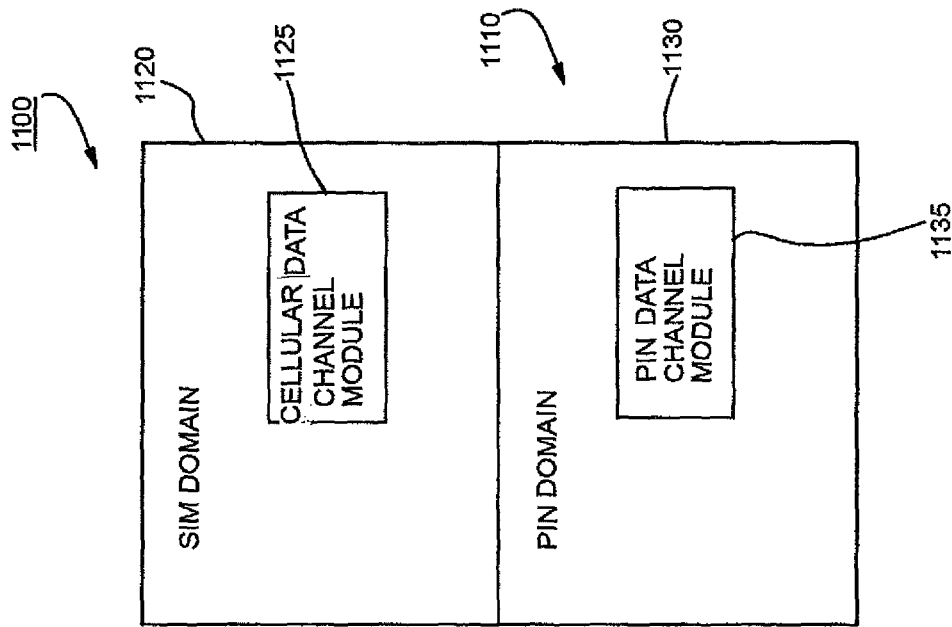
Figure 11:
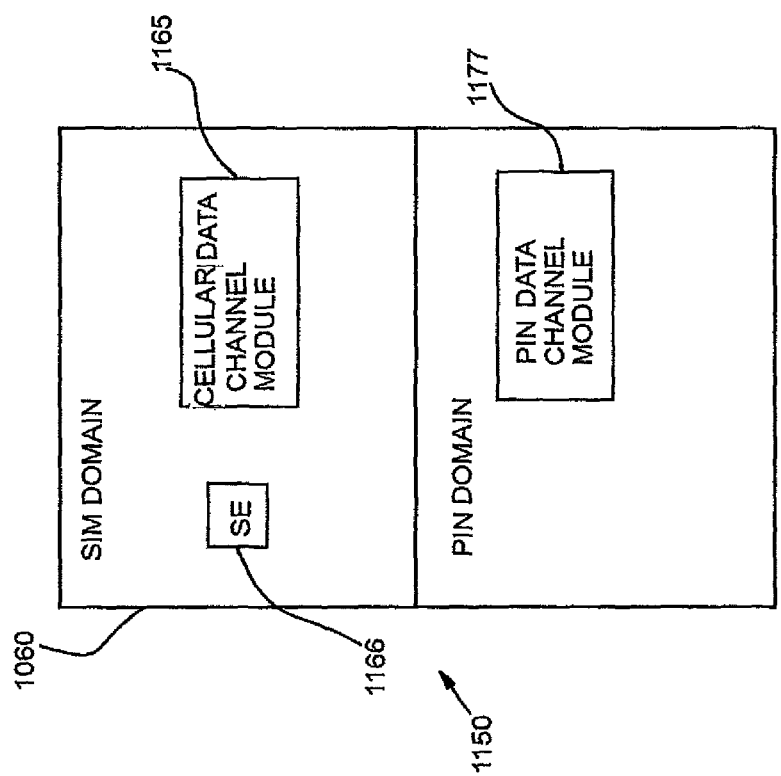

FIG. 11 shows an alternative embodiment of a system 1100 comprising a server 1110 and a mobile terminal. Many of the components of the server and mobile terminal are the same and operate in the same manner as components in FIG. 10 bearing like number except numbered with a 1000 series number. The SE 1166 in FIG. 11 illustratively resides in the SIM domain in the terminal in this embodiment so that the SE transactions occurs at the SIM domain level of the mobile terminal instead of at the PIN domain level as disclosed in the illustrative embodiment of FIG. 6B. However, it is the server 1110, which is configured to operate in the SIM domain, that is advantageously provided with a PIN number and a PIN data channel module 1135 to enable the SE transaction to occur in the PIN domain on the server end. In this case the SE transaction occurs in the PIN domain on the server end even though it is occurring in the SIM domain on the mobile terminal end. Hence, the SE transaction in this embodiment is not as secure as the embodiment shown in FIG. 10 where the SE transaction is taking place in the PIN domain on both mobile terminal and server ends. However, the SE transaction is nonetheless more secure than conventional SE transactions since part of the SE transaction is occurring in the more secure PIN domain, in particular the PIN domain of the server in the FIG. 11 example.

In other words, by identifying the servers with PIN numbers according to this disclosure, the servers may take and receive SE transaction messages at the PIN domain level at the server end; thereby further enhancing the security of SE transactions. In the embodiment shown in FIG. 11, SE transactions between the server and the mobile terminal occur at the PIN domain level on the server end, albeit at the SIM domain level on the mobile terminal end; thereby providing more security than is typically possible with SE transactions which occur in the SIM domain on both mobile terminal and server ends. But again, it is the embodiment of FIG. 10 that perhaps illustrates a more secure environment for the SE transaction, since in FIG. 10 the SE transaction is occurring in the PIN domain on both the mobile terminal and the server ends. In other words, in the embodiment of FIG. 10, it is possible for the entire SE transaction to occur in the secure PIN domain, where greater security for the SE transaction is possible. There is thus seen a device, system, and method for enhancing the security of SE transactions by residing the SE in the PIN domain of a mobile terminal. Even greater security is possible by providing PIN addresses to the servers used by the TSM which allow the servers to also engage in SE transactions in the PIN domain where communications are typically under the control of a single provider.

By providing the SE as part of the mobile terminal in contrast to the use of a SE within the SIM, SE as part of the mobile device, rather than within the SIM, the communications link between the card issuer or TSM and the SE may be carried between the BlackBerry server and the mobile device over the BlackBerry PIN network or the server and over a network of any provider or company that provides PIN networking services.

Since the PIN network is within the control of a single entity, illustratively, Research In Motion, which is now BlackBerry, but it could be any provider of PIN networking, all PIN addresses are issued by BlackBerry. As a result, only BlackBerry mobile devices and mobile devices using BlackBerry-licensed software are provided with a PIN.

This disclosure is not limited to handsets that have a SIM (or RUIM). The teaching of this disclosure may be used with any handset that is provided with a secure element SE for NFC. For example, CDMA handsets usually do not have a SIM (or RUIM). However, the handset may have a secure element for NFC. SE transactions between the handset and the server may still occur in the PIN domain as taught by this disclosure. Hence, the lack of a SIM or RUIM will still permit application of the capabilities taught herein.

A mobile terminal practicing the teachings of this disclosure would be fully compatible with the NFC Forum specifications. The NFC Forum (http://www.nfc-forum.org/) is the group that defines the NFC (near-field communications) specifications. They are available at http://www.nfc-forum.org/specs/. The NFC Forum specifications permit the secure element (SE) to be provided either on the SIM, or on the mobile handset. Hence, a mobile terminal practicing the teachings of this disclosure would be fully compatible with the NFC Forum specifications.

The telecommunication network and mobile devices that may be used for the cellular data communication network and the mobile devices for use with this disclosure may be based on any standards or protocol. The standards may include the 3GPP Family, including GSM; EDGE, UMITS/UTRA, 3GPP, LTE Advanced, etc.; the 3GPP2 Family such as CDMA; and other families or telecommunication network and mobile device technologies. Any of these and other technologies may be enabled to perform SE transactions in the PIN domain in accordance with the teaching of this disclosure.

The communication method, system and device of this disclosure enhances the security of messages communicated between a mobile device and a trusted service manager. Illustrative applications for the communication method, system, and device of this disclosure include messaging between a mobile phone and a trusted service manager in connection with messages pertaining to a financial transaction. Another application is messaging between a mobile phone and a trusted service manager in connection with accessing entry to a secure facility.

Illustratively, the mobile device is a RIM BlackBerry device. However, the disclosure is not limited to a BlackBerry device and may include any device that may be configured to operate in accordance with the PIN messaging protocol in accordance with this disclosure. In the illustrative embodiment, the communication of the message may occur over NFC spectrum. However, the disclosure is not limited to NFC and may include any spectrum for communicating secure messages.

In an illustrative embodiment, the unique number used to identify the phone is a personal identification number (PIN) exemplified by the use of such a PIN by a RIM BlackBerry mobile device. However, the disclosure is not limited to PIN numbers but include any number that may be associated with a mobile device to uniquely identify that phone in the network. In an illustrative embodiment, the trusted relay is a RIM relay 300 of the type used by RIM in the management of PIN messages. However, the disclosure is not limited to RIM Relays but include any trusted relay that may manage a unique identification number embedded in the header field of a message for the purpose communicating messages between a mobile device and a trusted service manager. In the illustrative example, the messages to which this disclosure pertains are between a mobile device and a trusted service manager. By trusted service manager is meant any service provider of a trusted service and may include a credit card company or a security company.

It will be apparent to those skilled in the art that various modifications and variations can be made to the disclosed system, device, and method. Other embodiments will be apparent to those skilled in the art from the consideration of the specification and practice of the disclosed system, device, and method. It is intended that the specification and examples be considered as example only, with a true scope being indicated by the following claims and their equivalents.

What is claimed is:

1. A method for communicating a plurality of messages over a network using a secure messaging protocol between a trusted service manager and a mobile device having a security element, the method comprising the steps of:
   receiving at a network node the plurality of messages, each message in the plurality of messages having a header field and a message field, wherein the message field includes message content, and wherein the plurality of messages includes at least one PIN message that includes a number in the header field that is unique to the mobile device;
   distinguishing at the network node between the PIN message and other messages in the plurality of messages, based on a presence of the unique mobile device number in the header field of the PIN message, and an absence of the unique mobile device number in the header field of other messages in the plurality of messages;
   routing, by the network node, only the PIN message to a trusted relay;
   referencing by the trusted relay a registry of information on one or more trusted service managers to validate an identity and location of the trusted service manager involved in communicating the PIN message; and
   routing, by the trusted relay, the PIN message based on validation of the identity and location of the trusted service manager and on the unique mobile device number in the header field of the PIN message.

2. The method of claim 1:
   wherein the PIN message includes an address in the header field, the address uniquely identifying a destination of the PIN message;
   and wherein routing only the PIN message comprises using the address uniquely identifying the destination of the PIN message to route the PIN message.

3. The method of claim 1 wherein receiving at a network node the plurality of messages, each message in the plurality of messages having a header field and a message field comprises receiving a message sent by a mobile device via a near field communication radio.

4. The method of claim 1 wherein the number in the header field that is unique to the mobile device comprises a personal identification number and wherein routing only the PIN message comprises using the personal identification number to route the message.

5. The method of claim 1 wherein the message content in the message field comprises a message configured to effectuate a financial transaction, and wherein the method further comprises the trusted service manager acting in connection with effectuating the financial transaction.

6. The method of claim 1 wherein the message content in the message field comprises a message configured to access entry to a secure facility.

7. The method of claim 1, wherein receiving at the network node the plurality of messages comprises receiving a message sent by the trusted service manager for communication to the mobile device.

8. The method of claim 1, wherein receiving at the network node the plurality of messages comprises receiving a message sent by the mobile device for communication to the trusted service manager.

* * * * *